US008672419B2

United States Patent
Miyazaki et al.

(10) Patent No.: US 8,672,419 B2
(45) Date of Patent: Mar. 18, 2014

(54) BRAKE SYSTEM

(75) Inventors: Tetsuya Miyazaki, Toyota (JP);
Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 126 days.

(21) Appl. No.: 13/254,262

(22) PCT Filed: Feb. 2, 2010

(86) PCT No.: PCT/JP2010/051403
§ 371 (c)(1),
(2), (4) Date: Sep. 1, 2011

(87) PCT Pub. No.: WO2011/096038
PCT Pub. Date: Aug. 11, 2011

(65) Prior Publication Data
US 2011/0316326 A1    Dec. 29, 2011

(51) Int. Cl.
*B60T 8/34* (2006.01)
*B60T 8/40* (2006.01)

(52) U.S. Cl.
USPC ............... 303/113.4; 303/113.1; 303/116.2; 303/119.1

(58) Field of Classification Search
USPC ............... 303/20, 113.1, 113.4, 116.1, 116.2, 303/119.1, 122, 122.09
See application file for complete search history.

(56) References Cited

U.S. PATENT DOCUMENTS

| | | | | |
|---|---|---|---|---|
| 5,180,211 | A * | 1/1993 | Weise et al. | 303/119.1 |
| 5,992,949 | A * | 11/1999 | Nakamura et al. | 303/116.1 |
| 6,851,763 | B1 * | 2/2005 | Feigel | 303/116.1 |
| 2005/0151416 | A1 * | 7/2005 | Feigel | 303/11 |
| 2006/0066146 | A1 | 3/2006 | Otomo | |
| 2007/0132312 | A1 | 6/2007 | Ajiro et al. | |
| 2007/0194622 | A1 | 8/2007 | Nakazawa et al. | |

(Continued)

FOREIGN PATENT DOCUMENTS

| | | |
|---|---|---|
| JP | 10 287227 | 10/1998 |
| JP | 11 227590 | 8/1999 |

(Continued)

OTHER PUBLICATIONS

International Search Report issued May 18, 2010 in PCT/JP10/051403 filed Feb. 2, 2010.

*Primary Examiner* — Thomas J Williams
(74) *Attorney, Agent, or Firm* — Oblon, Spivak, McClelland, Maier & Neustadt, L.L.P.

(57) ABSTRACT

A brake system including: (i) hydraulic brakes provided for respective wheels of a vehicle, and configured to be activated by hydraulic pressures of respective brake cylinders so as to restrain rotations of the respective wheels; (ii) a power hydraulic pressure source including a drive source that is activatable by supply of electric energy, and configured to generate hydraulic pressure by activation of the drive source; and (iii) a common passage to which the power hydraulic pressure source and the brake cylinders of the hydraulic brakes are connected. The brake cylinders include a first brake cylinder connected to the common passage via a first individual passage that is provided with a normally-close electromagnetic valve as a first individual control valve. The brake cylinders include a second brake cylinder connected to the common passage via a second individual passage that is provided with a normally-open electromagnetic valve as a second individual control valve.

16 Claims, 18 Drawing Sheets

(56) References Cited

U.S. PATENT DOCUMENTS

| | | | |
|---|---|---|---|
| 2007/0252428 A1* | 11/2007 | Okano et al. | 303/113.1 |
| 2010/0259096 A1 | 10/2010 | Rieth et al. | |
| 2012/0068529 A1* | 3/2012 | Nakaoka et al. | 303/114.1 |
| 2012/0235469 A1* | 9/2012 | Miyazaki et al. | 303/9.63 |
| 2012/0256477 A1* | 10/2012 | Miyazaki et al. | 303/6.01 |

FOREIGN PATENT DOCUMENTS

| | | |
|---|---|---|
| JP | 2006-123889 | 5/2006 |
| JP | 2007 182210 | 7/2007 |
| JP | 2007 216850 | 8/2007 |
| JP | 2008 126690 | 6/2008 |
| JP | 2009 502645 | 1/2009 |

* cited by examiner # BRAKE SYSTEM

TECHNICAL FIELD

The present invention relates to a brake system having a hydraulic brake configured to restrain rotation of a wheel.

BACKGROUND ART

Patent literature 1 discloses a brake system having (a) a hydraulic brake configured to restrain rotation of a wheel, (b) a master cylinder, (c) an accumulator, (d) a pressure increasing mechanism utilizing hydraulic pressure of the accumulator and activatable by activation of an electric actuator, (e) a selector valve configured to select a higher one of hydraulic pressure of the pressure increasing mechanism and hydraulic pressure of the master cylinder, and to supply the selected hydraulic pressure to a brake cylinder of the hydraulic brake, and (f) a pressure holding valve which is provided between the selector valve and the brake cylinder and which is a normally-open electromagnetic valve that is to be placed in an open state when electric current is not being supplied to a solenoid thereof.

Patent literature 2 discloses a brake system having (a) hydraulic brakes provided for front right, front left, rear right and rear left wheels of a vehicle and configured to restrain rotations of the wheels, (b) a master cylinder, (c) a mechanical booster mechanism provided between the master cylinder and brakes cylinders of ones of the hydraulic brakes which are provided for the front right and front left wheels, (d) a high pressure source and (e) linear control valves provided between the high pressure source and brake cylinders of the hydraulic brakes provided for the front right, front left, rear right and rear left wheels.

Patent literature 3 discloses a brake system having (a) a hydraulic brake activatable by hydraulic pressure of a brake cylinder and configured to restrain rotation of a wheel of a vehicle, (b) a master cylinder, (c) a master cut-off valve provided between the master cylinder and the brake cylinder, (d) a pressure holding valve that is a normally-open electromagnetic valve provided between the master cut-off valve and the brake cylinder, (e) a pressure reducing valve that is a normally-close electromagnetic valve provided between the brake cylinder and a low pressure source, and (f) a pump configured to pump a working fluid stored in a reservoir and to supply the working fluid onto an upstream side of the pressure holding valve. In this brake system, during execution of an anti-lock control, the hydraulic pressure of the brake cylinder is controlled by opening and closing the pressure holding valve and the pressure reducing valve in a state in which the brake cylinder is isolated from the master cylinder.

PRIOR ART LITERATURES

Patent Literatures

[Patent Literature 1] JP-2009-502645A
[Patent Literature 2] JP-H10-287227A
[Patent Literature 3] JP-H11-227590A

DISCLOSURE OF THE INVENTION

Object to be Achieved by the Invention

An object of the present invention is to improve a brake system.

Measures for Achieving the Object and Effect

A brake system includes: (i) a plurality of hydraulic brakes provided for respective wheels of a vehicle, and configured to be activated by hydraulic pressures of respective brake cylinders thereof so as to restrain rotations of the respective wheels; (ii) a power hydraulic pressure source including a drive source that is activatable by supply of electric energy thereto, and configured to generate hydraulic pressure by activation of the drive source; and (iii) a common passage to which the power hydraulic pressure source and the brake cylinders of the hydraulic brakes are connected, the brake system being characterized in that: (x) the brake cylinders include a first brake cylinder connected to the common passage via a first individual passage that is provided with a first individual control valve, the first individual control valve being a normally-close electromagnetic valve that is to be placed in a closed state when electric current is not being supplied to a solenoid of the first individual control valve; and (y) the brake cylinders include a second brake cylinder that is other than the first brake cylinder, the second brake cylinder being connected to the common passage via a second individual passage which is other than the first individual passage and which is provided with a second individual control valve, the second individual control valve being a normally-open electromagnetic valve that is to be placed in an open state when electric current is not being supplied to a solenoid of the second individual control valve.

The power hydraulic pressure source is connected to the common passage while the first and second brake cylinders are connected to the common passage via the first and second individual passages, respectively, the first individual passage is provided with the first individual control valve that is the normally-close electromagnetic valve while the second individual passage is provided with the second individual control valve that is the normally-open electromagnetic valve.

In the brake system described in each of the patent literatures 1 and 3, all of pressure holding valves each corresponding to the individual control valve are normally-open electromagnetic valves. Further, in any one of the patent literatures 1-3, it is not described that an individual control valve provided for the first brake cylinder is a normally-close electromagnetic valve while an individual control valve provided for the second brake cylinder is a normally-open electromagnetic valve.

In the brake system, the first brake cylinder can be isolated from the common passage and the second brake cylinder can be in communication with the common passage, for example, in a state in which the electric current is not being supplied to the solenoids of the first and second individual control valves. Thus, a brake line including the first brake cylinder and a brake line including the second brake cylinder can be isolated from each other, so that, even in the event of fluid leakage occurring in one of the brake lines, the other of the brake lines can be free from influence of the fluid leakage occurring in the one of the brake lines. Further, it is possible to arrange such that the hydraulic pressure is supplied from the power hydraulic pressure source to the second brake cylinder while the hydraulic pressure is supplied from another hydraulic pressure source to the first brake cylinder. Still further, as described later, where the first and second brake cylinders are connected to respective manual hydraulic pressure sources, it is possible to arrange such that the hydraulic pressure is supplied from the power hydraulic pressure source to one of the manual hydraulic pressure sources via the second individual control valve for thereby increasing the hydraulic pressure in the other of the manual hydraulic pressure sources, and the increased hydraulic pressure is supplied from the other of the manual hydraulic pressure sources to the first brake cylinder.

It is noted that the electromagnetic valve is a valve that is controllable to be placed in at least the open and closed states by controlling electric current supplied to the solenoid of the valve, and that the electromagnetic valve may be either a linear control valve or a simple on/off valve. In the linear control valve, a difference between the hydraulic pressure on one of opposite sides of the valve and the hydraulic pressure on the other of the opposite sides of the valve or/and an opening angle of the valve are continuously controllable by continuously controlling the electric current supplied to the solenoid of the valve. In the simple on/off valve, the open and closed states can be selectively established by selectively turning ON/OFF the supply of the electric current to the solenoid of the valve. Hereinafter, in the description of the present application, the term "electromagnetic valve" should be interpreted as either a linear control valve or a simple on/off valve, unless otherwise specified.

Various Modes of the Invention

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A brake system including:
a plurality of hydraulic brakes provided for respective wheels of a vehicle, and configured to be activated by hydraulic pressures of respective brake cylinders thereof so as to restrain rotations of the respective wheels;
a power hydraulic pressure source including a drive source that is activatable by supply of electric energy thereto, and configured to generate hydraulic pressure by activation of the drive source; and
a common passage to which the power hydraulic pressure source and the brake cylinders of the hydraulic brakes are connected,
the brake system being characterized in that:
the brake cylinders include a first brake cylinder connected to the common passage via a first individual passage that is provided with a first individual control valve, the first individual control valve being a normally-close electromagnetic valve that is to be placed in a closed state when electric current is not being supplied to a solenoid of the first individual control valve; and
the brake cylinders include a second brake cylinder that is other than the first brake cylinder, the second brake cylinder being connected to the common passage via a second individual passage which is other than the first individual passage and which is provided with a second individual control valve, the second individual control valve being a normally-open electromagnetic valve that is to be placed in an open state when electric current is not being supplied to a solenoid of the second individual control valve.

(2) The brake system according to mode (1), wherein each of the first and second individual control valves is an ON/OFF switch valve that is switchable between two states consisting of the open and closed states, and is to be placed in a selected one of the two states which is selected depending on whether or not the electric current is being supplied to the solenoid thereof.

Where each of the first and second individual control valves is the simple on/off valve, the brake system can be made at a cost lower than where each of the first and second individual control valves is a linear control valve.

(3) The brake system according to mode (1) or (2), including first and second manual hydraulic pressure sources each of which is configured to generate hydraulic pressure by operation of a brake operating member by an operator, wherein the first manual hydraulic pressure source is connected, via a first manual passage, to a portion of the first individual passage which is located between the first individual control valve and the first brake cylinder, and wherein the second manual hydraulic pressure source is connected, via a second manual passage, to a portion of the second individual passage which is located between the second individual control valve and the second brake cylinder.

To the first and second brake cylinders, the first and second manual hydraulic pressure sources are connected, respectively, without via the common passage and the individual control valves.

(4) The brake system according to any one of modes (1)-(3), wherein the first and second brake cylinders are provided for respective front wheels of the vehicle.

Where the first and second brake cylinders are provided for the front wheels, the hydraulic brakes for the front wheels can be activated even in a failure state of the system. In this arrangement, a brake force applied to an entirety of the vehicle can be made larger where the hydraulic brakes for the rear wheels are activated.

(5) The brake system according to any one of modes (2)-(4), wherein the first and second manual passages are provided with first and second manual-passage cut-off valves, respectively, each of which is a normally-open electromagnetic valve that is to be placed in an open state when electric current is not being supplied to a solenoid thereof.

Since the first and second manual-passage cut-off valves are normally-open electromagnetic valves, the hydraulic pressure can be supplied from the first and second manual hydraulic pressure sources to the first and second brake cylinders even in the event of failure of an electric system.

(6) The brake system according to mode (5), including:
a manual hydraulic-pressure sensor provided in the first manual passage;
a controlled hydraulic-pressure sensor provided in the common passage; and
a brake-operation detecting device configured to detect, based on values detected by the manual hydraulic-pressure sensor and the controlled hydraulic-pressure sensor, generation of hydraulic pressure in each of the first and second manual hydraulic pressure sources.

Since the second individual control valve as well as the second manual-passage cut-off valve is a normally-open electromagnetic valve, the second manual hydraulic pressure source and the common passage are in communication with each other when the electric current is not being supplied to the solenoids of the second individual control valve and the second manual-passage cut-off valve. Therefore, the hydraulic pressure of the second manual hydraulic pressure source can be detected by the controlled hydraulic-pressure sensor, while the hydraulic pressure of the first manual hydraulic pressure source can be detected by the manual hydraulic-pressure sensor. In this instance, since the first individual control valve is a normally-close electromagnetic valve, the hydraulic pressure of the second manual hydraulic pressure source can be detected by the controlled hydraulic-pressure sensor, without being influenced by the hydraulic pressure of the first manual hydraulic pressure source.

Therefore, owing to the manual hydraulic-pressure sensor and the controlled hydraulic-pressure sensor, the hydraulic pressure of the first manual hydraulic pressure source and the hydraulic pressure of the second manual hydraulic pressure source can be detected independently of each other. That is, owing to the manual hydraulic-pressure sensor and the controlled hydraulic-pressure sensor, it is possible to accurately detect whether or not the hydraulic pressure is generated in each of the first and second manual hydraulic pressure sources. Thus, the manual hydraulic-pressure sensor and the controlled hydraulic-pressure sensor can be used as a brake switch.

(7) The brake system according to mode (5) or (6), including an output hydraulic-pressure control device configured to control hydraulic pressure outputted from the power hydraulic pressure source,
wherein the second individual control valve is provided between the output hydraulic-pressure control device and the second manual-passage cut-off valve.

The second individual control valve is provided between the second manual-passage cut-off valve and the output hydraulic-pressure control device. Since each of the second individual control valve and the second manual-passage cut-off valve is the normally-open electromagnetic valve, the output hydraulic-pressure control device and the second manual hydraulic pressure source are in communication with each other in a state in which the electric current is not being supplied to the solenoids of the second individual control valve and the second manual-passage cut-off valve.

For example, the hydraulic pressure outputted from the power hydraulic pressure source can be supplied to the second manual hydraulic pressure source via the second individual control valve and the second manual-passage cut-off valve whereby it is possible to increase the hydraulic pressure of the first manual hydraulic pressure source and the hydraulic pressure of the first brake cylinder.

The "output hydraulic-pressure control device" may include (i) an electric-current controlling portion configured to control the hydraulic pressure outputted from the power hydraulic pressure source, by controlling the electric current supplied to the drive source, or may include (ii) (a) an output hydraulic-pressure control valve provided between the power hydraulic pressure source and the common passage and (b) a control-valve controlling portion configured to control the hydraulic pressure outputted from the power hydraulic pressure source, by controlling the output hydraulic-pressure control valve.

The feature that "the second individual control valve is provided between the output hydraulic-pressure control device and the second manual-passage cut-off valve" may be interpreted to mean that, in case of the above arrangement (i) with the electric-current controlling portion, the second individual control valve is structurally provided between the power hydraulic pressure source and the second manual-passage cut-off valve wherein the hydraulic pressure outputted from the power hydraulic pressure source is controlled by the electric-current controlling portion. Further, the above feature may be interpreted to mean that, in case of the above arrangement (ii) with the output hydraulic-pressure control valve and the control-valve controlling portion, the second individual control valve is structurally provided between the output hydraulic-pressure control valve and the second manual-passage cut-off valve wherein the output hydraulic-pressure control valve is controlled by the control-valve controlling portion. In either of the cases, the hydraulic pressure is supplied to the second individual control valve from the power hydraulic pressure source that is controlled by the output hydraulic-pressure control device, so that the second individual control valve can be referred to as a valve that is provided between the output hydraulic-pressure control device and the second manual-passage cut-off valve.

(8) The brake system according to any one of modes (2)-(7), including a tandem master cylinder including a housing, first and second pressurizing pistons slidably fitted in the housing and an extension limiting portion provided between the first and second pressurizing pistons,
wherein the first manual hydraulic pressure source is a first pressurizing chamber which is defined in the housing and which is located on a front side of the first pressurizing piston, while the second manual hydraulic pressure source is a second pressurizing chamber which is defined in the housing and which is located on a front side of the second pressurizing piston.

When electric current is not being supplied to the solenoid, the common passage and the second pressurizing chamber are in communication with each other, so that the hydraulic pressure can be supplied from the power hydraulic pressure source to the second pressurizing chamber. Therefore, the second pressurizing piston is forced in a backward direction, so that it is possible to increase the hydraulic pressure in the first pressurizing chamber, even without increasing the operating force applied to the brake operating member.

If the hydraulic pressure is supplied to the first pressurizing chamber rather than to the second pressurizing chamber, the forward movement of the second pressurizing piston is limited since the extension limiting portion is provided between the first and second pressurizing pistons. In this sense, it is appropriate that the hydraulic pressure is supplied to the second pressurizing chamber.

It is noted that, where the brake system includes a tandem master cylinder that does not have an extension limiting portion, the hydraulic pressure of the power hydraulic pressure source may be supplied either to the first pressurizing chamber or the second pressurizing chamber.

(9) The brake system according to any one of modes (1)-(8), including a hydraulic-pressure-source control device configured to control activation of the power hydraulic pressure source,
wherein the hydraulic-pressure-source control device includes a failure-state drive-source controlling portion that is configured, when the brake system is in a given failure state, to cause the power hydraulic pressure source to be activated by controlling the drive source.

According to the failure-state drive-source controlling portion, even when the brake system is in a given failure state, it is possible to control the drive source and to activate the power hydraulic pressure source. With the power hydraulic pressure source being activated by controlling the drive source, the hydraulic pressure of the power hydraulic pressure source can be supplied to the common passage, so that the hydraulic pressure can be supplied to at least the second brake cylinder.

A failure of the drive source is not included in the given failure state. For example, (i) a failure of the first or second individual control valve, (ii) a failure of a controlling portion (e.g., a computer or combination of the computer and a drive circuit) configured to control electric current supplied to the individual control valve, (iii) a breaking of a signal wire interconnecting the controlling portion and the individual control valve, (iv) a breaking of a signal wire interconnecting the controlling portion and a sensor or the like, (v) a failure of the sensor or the like, and (vi) a failure of an electric system correspond to the given failure state. Further, where the brake system includes an output hydraulic-pressure control device configured to control the hydraulic pressure outputted by the power hydraulic pressure source, a failure of the output hydraulic-pressure control device corresponds to the given failure state.

It is noted that the failure-state drive-source controlling portion may either include or not include a computer.

(10) The brake system according to mode (9), wherein the failure-state drive-source controlling portion includes an operating-state drive-source controlling portion is configured, when the brake system is in the given failure state with the brake operating member being operated by an operator, to cause the power hydraulic pressure source to be activated by controlling the drive source.

The drive source may be controlled, for example, by supplying a predetermined amount of the electric current to the drive source, by supplying the electric current to the drive source in accordance with a given pattern, or by placing the drive source into a state allowing supply of the electric current to the drive source. The failure-state drive-source controlling portion may be referred to as a failure-state drive-source activating portion.

(11) The brake system according to any one of modes (1)-(10), including a brake hydraulic-pressure control device configured to control hydraulic pressure of at least one of the brake cylinders, based on at least a state of operation of a brake operating member by an operator, wherein the hydraulic-pressure-source control device includes a hydraulic-pressure-control-failure-state controlling portion configured, when the brake hydraulic-pressure control device is in failure, to control the drive source.

(12) The brake system according to mode (11), wherein the brake hydraulic-pressure control device includes (a) a brake-operation-state detecting device configured to detect the state of operation of the brake operating member, and (b) a common-passage hydraulic-pressure controlling portion configured to control hydraulic pressure in the common passage, by controlling hydraulic pressure outputted from the power hydraulic pressure source, based on the state of operation of the brake operating member detected by the brake-operation-state detecting device.

Since the brake hydraulic-pressure control device is configured to control hydraulic pressure outputted from the power hydraulic pressure source, the brake hydraulic-pressure control device may be constituted by the output hydraulic-pressure control device.

The state of operation of the brake operating member can be represented by, for example, a stroke position of the brake operating member and an operating force applied to the brake operating member. The operating force can be represented also by a hydraulic pressure of each of the manual hydraulic pressure sources.

The control made by the common-passage hydraulic-pressure controlling portion corresponds to, for example, a control that is to be made by a regenerative cooperative control described below in description of embodiments of the invention. However, in an arrangement without application of a regenerative brake, the control made by the common-passage hydraulic-pressure controlling portion corresponds to a control made to cause the hydraulic pressure of the brake cylinder to correspond to a required amount of brake force which is dependent on the state of operation of the brake operating member by the operator.

To the above-described failure of the brake hydraulic-pressure control device, at least one a failure of the brake-operation-state detecting device and a failure of the common-passage hydraulic-pressure controlling portion corresponds. To the failure of the common-passage hydraulic-pressure controlling portion, for example, (i) a failure of the output hydraulic-pressure control valve, (ii) a failure of a controlling portion constituted principally by a computer and configured to control the output hydraulic-pressure control valve and the drive source, (iii) a breaking of a signal wire interconnecting the brake-operation-state detecting device and the controlling portion, (iv) a breaking of a signal wire interconnecting the controlling portion, the drive source and the output hydraulic-pressure control valve, (v) a failure of an electric power source configured to supply electric energy to the controlling portion and the output hydraulic-pressure control valve, and (vi) a breaking of a signal wire interconnecting the controlling portion, the output hydraulic-pressure control valve and the electric power source.

It is noted that the hydraulic-pressure-source control device may be either constituted by a part of the brake hydraulic-pressure control device, or constituted independently of the brake hydraulic-pressure control device.

(13) The brake system according to any one of modes (1)-(12), including (a) a main electric power source capable of supplying electric energy at least to the solenoid of the first individual control valve and the solenoid of the second individual control valve and (b) a sub-electric power source capable of supplying electric energy to the drive source even in event of failure of the main electric power source.

(14) The brake system according to any one of modes (9)-(13), including (a) a main electric power source capable of supplying electric energy to the brake hydraulic-pressure control device and (b) a sub-electric power source capable of supplying electric energy to the failure-state drive-source controlling portion even in event of failure of the main electric power source.

Even in event of failure of the main electric power source that disables supply of the electric energy from the main electric power source, it is possible to control the drive source with supply of the electric energy from the sub-electric power source, as long as the sub-electric power source functions normally.

It is noted that, to the drive source and the failure-state drive-source controlling portion, not only the sub-electric power source but also the main electric power source may be connected.

(15) The brake system according to any one of modes (9)-(14), wherein the failure-state drive-source controlling portion includes a pattern controlling portion configured to control activation of the drive source, in accordance with a predetermined pattern.

(16) The brake system according to mode (15) including an output hydraulic-pressure control valve which is provided between the power hydraulic pressure source and the common passage, the output hydraulic-pressure control valve being an electromagnetic valve that is to be placed in a closed state when electric current is not being supplied to a solenoid thereof, wherein the pattern controlling portion includes a high flow-rate controlling portion configured to control the drive source such that a flow rate of working fluid outputted from the power hydraulic pressure source is made higher than a first given value during a stage since start of control by the pattern controlling portion until elapse of a predetermined time from the start of the control by the pattern controlling portion.

Since the power hydraulic pressure source is connected to the common passage via the output hydraulic-pressure control valve, the hydraulic pressure of the common passage can be controlled by controlling the output hydraulic-pressure control valve whereby the hydraulic pressures in the respective brake cylinders can be controlled commonly to each other.

Since the output hydraulic-pressure control valve is a normally-close electromagnetic valve, the hydraulic pressure is supplied from the power hydraulic pressure source to the common passage, when the hydraulic pressure of the power hydraulic pressure source is higher than a valve opening pressure (i.e., a pressure placing the output hydraulic-pressure control valve into the open state) even without the electric current being supplied to a solenoid of the output hydraulic-pressure control valve. When the output hydraulic-pressure control valve is being placed in the closed state, the hydraulic pressure outputted from the power hydraulic pressure source can be increased to the valve opening pressure in an earlier stage where a rate of flow of the working fluid outputted from the power hydraulic pressure source is high than where the rate of flow of the working fluid outputted from the power hydraulic pressure source is low.

It is appropriate that the flow rate of the outputted working fluid is made high upon start of the control by the pattern controlling portion because the hydraulic pressure in each brake cylinder can be rapidly increased in event of the failure.

Where the drive source is an electric motor, it is desirable that a rotational velocity of the electric motor is increased.

After elapse of the predetermined time, the flow rate of the working fluid outputted from the power hydraulic pressure source may be controlled to be lower than the first given value. Once the output hydraulic pressure reaches the valve opening pressure, there is a low need for output of the working fluid from the power hydraulic pressure source at a high flow rate. Therefore, the flow rate of the working fluid outputted from the power hydraulic pressure source may be reduced after elapse of the predetermined time.

(17) The brake system according to any one of modes (2)-(4), wherein the first manual passage is provided with a first manual-passage cut-off valve which is a normally-open electromagnetic valve that is to be placed in an open state when electric current is not being supplied to a solenoid thereof, while the second manual passage is provided with a second manual-passage cut-off valve which is a normally-close electromagnetic valve that is to be placed in a closed state when electric current is not being supplied to a solenoid thereof.

(18) The brake system according to any one of modes (2)-(17), including a hydraulic-pressure supply controlling portion configured to control supply of hydraulic pressure to the first and second brake cylinders, by controlling at least the first and second individual control valves and the first and second manual-passage cut-off valves, wherein the hydraulic-pressure supply controlling portion includes a control-valve controlling portion capable of switching between a first state in which the first and second brake cylinders are in communication with the common passage and a second state in which hydraulic pressure is supplied from the common passage to the second brake cylinder while hydraulic pressure is supplied from the first manual hydraulic pressure source to the first brake cylinder, the first state being established by placing each of the first and second manual-passage cut-off valves in the closed state and placing each of the first and second individual control valves in the open state, the second state being established by placing the first manual-passage cut-off valve in the open state, placing the second manual-passage cut-off valve in the closed state, placing the first individual control valve in the closed state, and placing the second individual control valve in the open state.

When the hydraulic-pressure supply controlling portion is being placed in the first state, the first and second brake cylinders are in communication with the common passage and are isolated from the first and second manual hydraulic pressure sources, so that the hydraulic pressure of the power hydraulic pressure source can be supplied to the first and second brake cylinders.

When the hydraulic-pressure supply controlling portion is being placed in the second state, the second brake cylinder is in communication with the common passage and is isolated from the second manual hydraulic pressure source while the first brake cylinder is in communication with the first manual hydraulic pressure source and is isolated from the first manual hydraulic pressure source. Therefore, during the second state in which the first and second brake cylinders are isolated from each other, the hydraulic pressure of the power hydraulic pressure source can be supplied to the second brake cylinder while the hydraulic pressure of the first manual hydraulic pressure source can be supplied to the first brake cylinder.

(19) The brake system according to mode (18), wherein the hydraulic-pressure supply controlling portion includes an electromagnetic-valve controlling portion which is configured to establish the first state when the power hydraulic pressure source and the first and second individual control valves function normally, and is configured to establish the second state when there is a possibility of fluid leakage in the brake system.

By establishing the second state when there is a possibility of fluid leakage, even in the event of fluid leakage occurring in one of the first and second brake lines (including the respective first and second brake cylinders), it is possible to avoid the other of the first and second brake lines from being influenced by the fluid leakage occurring in the one of the first and second brake lines.

(20) The brake system according to any one of modes (1)-(19), wherein the hydraulic brakes are provided for respective front right, front left, rear right and rear left wheels of the vehicle that constitute two pairs of wheels, each pair of the two pairs of wheels being constituted by two of the wheels that are located in respective positions that are diagonal to each other, wherein the brake cylinders of the hydraulic brakes are connected to the common passage via respective individual passages, wherein each of two of the individual passages, which are connected to respective two of the brake cylinders provided for respective two of the wheels that constitute one pair of the two pairs of wheels, is provided with a first individual pressure-increasing valve, the first individual pressure-increasing valve being a normally-close electromagnetic valve that is placed in a closed state when electric current is not being supplied to a solenoid thereof, and wherein each of two of the individual passages, which are connected to respective two of the brake cylinders provided for respective two of the wheels that constitute the other pair of the two pairs of wheels, is provided with a second individual pressure-increasing valve, the second individual pressure-increasing valve being a normally-open electromagnetic valve that is placed in an open state when electric current is not being supplied to a solenoid thereof.

The second individual pressure-increasing valve, which is provided for each of the individual passages connected to the brake cylinders provided for the two wheels that are located in respective positions diagonal to each other, is a normally-open electromagnetic valve, so that the hydraulic pressure of the power hydraulic pressure source can be supplied to the brake cylinders provided for the two wheels that are located in the respective positions diagonal to each other, in a state in which the electric current is not being supplied to the solenoid of the second individual pressure-increasing valve.

Further, where the hydraulic pressure of the master cylinder is suppliable to the brake cylinders provided for the front right and left wheels, the hydraulic pressure can be supplied to the brake cylinders provided for three of the four wheels, thereby making it possible to avoid insufficiency of braking force, in a state in which the electric current is not being supplied to the solenoids of the individual control valves.

One of the two first individual pressure-increasing valve, which is provided for one of the front right and left wheels, can be considered to correspond to the first individual control valve, while the other of the two first individual pressure-increasing valve, which is provided for the other of the front right and left wheels, can be considered to correspond to the second individual control valve.

(21) The brake system according to any one of modes (1)-(19), wherein the hydraulic brakes are provided for respective front right, front left, rear right and rear left wheels of the vehicle, wherein two of the hydraulic brakes, which are provided for the respective rear right and rear left wheels of the vehicle, include respective brake cylinders that are connected to the common passage via a rear-right/left-wheel individual passage, and wherein the rear-right/left-wheel individual passage is provided with a rear-right/left-wheel individual control valve.

Where the hydraulic pressures of the brake cylinders provided for the rear right and left wheels are controlled through electromagnetic valves that are common to the brake cylinders provided for the rear right and left wheels, it is possible to reduce the number of the required electromagnetic valves and accordingly to reduce cost required for manufacturing the brake system.

The rear-right/left-wheel individual control valve may be either a normally-close electromagnetic valve that is to be placed in a closed state when electric current is not being supplied to a solenoid of the valve, or a normally-open electromagnetic valve that is to be placed in an open state when electric current is not being supplied to the solenoid of the valve.

Where the rear-right/left-wheel individual control valve is the normally-close electromagnetic valve, it is desirable, from a point of view of preventing brake dragging, that a check valve (allowing flow of the working fluid away from the brake cylinders toward the common passage and inhibiting flow of the working fluid away from the common passage toward the brake cylinders) is disposed in parallel with the rear-right/left-wheel individual control valve, or that a pressure reducing valve disposed between the brake cylinders and a low pressure source is constituted by a normally-open electromagnetic valve.

(22) The brake system according to any one of modes (1)-(21), including (a) an output hydraulic-pressure control device configured to control hydraulic pressure outputted from the power hydraulic pressure source, (b) a low pressure source and (c) at least one pressure-reducing individual valve each of which is provided between the low pressure source and a corresponding one of the brake cylinders of the hydraulic brakes provided for the respective front right, front left, rear right and rear left wheels of the vehicle, wherein the output hydraulic-pressure control device includes (i) a pressure-increasing output hydraulic-pressure control valve provided between the power hydraulic pressure source and the common passage and (ii) at least one of the at least one pressure-reducing individual valve.

Where the hydraulic pressure outputted from the power hydraulic pressure source is controlled and supplied to the common passage, namely, where the hydraulic pressure in the common passage is controlled by utilizing the hydraulic pressure of the power hydraulic pressure source, the output hydraulic-pressure control device may include both of the pressure-increasing output hydraulic-pressure control valve and the pressure-reducing output hydraulic-pressure control valve.

On the other hand, there are many cases where the pressure-reducing individual valve is provided between the low pressure source and each of at least one of the plurality of brake cylinders. By controlling the pressure-reducing individual valve or valves with the brake cylinders being in communication with the common passage, the hydraulic pressure in the common passage can be controlled whereby the hydraulic pressures in all the brake cylinders can be controlled commonly to each other.

The pressure-reducing individual valve may be either a normally-open electromagnetic valve or a normally-close electromagnetic valve, and may be either a linear control valve or a simple electromagnetic valve.

Further, the pressure-reducing individual valve included in the output hydraulic-pressure control device may be provided for any one of the front right, front left, rear right and rear left wheels of the vehicle. Further, two or more pressure-reducing individual valves may be included in the output hydraulic-pressure control device.

(23) The brake system according to mode (22), wherein each of the at least one pressure-reducing individual valve is switchable between the open and closed states, and is to be placed in a selected one of the open and closed states which is selected depending on whether or not the electric current is being supplied to the solenoid thereof, and wherein the output hydraulic-pressure control device includes a duty controlling portion configured to control a duty ratio of electric current supplied to the solenoid of each of the at least one pressure-reducing individual valve.

Where the pressure-reducing output hydraulic-pressure control valve is a linear control valve, the hydraulic pressure in the common passage can be controlled by continuously controlling the electric current supplied to the solenoid of the valve. Where the pressure-reducing output hydraulic-pressure control valve is a simple electromagnetic valve, the hydraulic pressure of the common passage can be controlled by controlling the duty ratio of the electric current supplied to the solenoid of the valve.

(24) The brake system according to any one of modes (1)-(23), including (a) a manual hydraulic pressure source that is configured to generate hydraulic pressure by operation of a brake operating member by an operator and (b) a pressure increasing mechanism which is provided between the manual hydraulic pressure source and the common passage and which is configured to increase hydraulic pressure of the manual hydraulic pressure source and to output the increased hydraulic pressure to the common passage.

Where the pressure increasing mechanism is connected to the common passage, the hydraulic pressure outputted from the pressure increasing mechanism can be supplied commonly to the plurality of brake cylinders. Further, the pressure increasing mechanism may be a mechanism that is mechanically activatable by the hydraulic pressure of the manual hydraulic pressure source, so that it is possible to generate the hydraulic pressure that is higher than the hydraulic pressure of the manual hydraulic pressure source, for example, even in event of failure of the electric power line.

(25) The brake system according to mode (24), wherein the pressure increasing mechanism includes (a) a mechanical pressure-increasing device configured to increase the hydraulic pressure of the manual hydraulic pressure source and to output the increased hydraulic pressure and (b) a high-pressure-side check valve which is provided between the mechanical pressure-increasing device and the power hydraulic pressure source and which is configured to allow flow of the working fluid in a direction away from the power hydraulic pressure source toward the mechanical pressure-increasing device and to inhibit flow of the working fluid in a direction opposite to the direction away from the power hydraulic pressure source toward the mechanical pressure-increasing device.

Since the above-described high-pressure-side check valve is provided between the power hydraulic pressure source and the mechanical pressure-increasing device, the flow of the working fluid between the power hydraulic pressure source and the mechanical pressure-increasing device is inhibited when the hydraulic pressure of the power hydraulic pressure source is lower than the hydraulic pressure of the mechanical pressure-increasing device. Owing to this arrangement, it is possible to satisfactorily avoid reduction of the hydraulic pressure outputted by the mechanical pressure-increasing device.

(26) The brake system according to mode (24) or (25), wherein the pressure increasing mechanism includes a manual-side check valve which is provided between the manual hydraulic pressure source and an output side of the mechanical pressure-increasing device and which is configured to allow flow of the working fluid in a direction away from the manual hydraulic pressure source toward the mechanical pressure-increasing device and to inhibit flow of the working fluid in a direction opposite to the direction away from the manual hydraulic pressure source toward the mechanical pressure-increasing device.

Owing to the above-described manual-side check valve, the hydraulic pressure outputted from the mechanical pressure-increasing device is prevented from flowing in the opposite direction toward the manual hydraulic pressure source.

Further, when the hydraulic pressure of the manual hydraulic pressure source becomes higher than the hydraulic pressure of the mechanical pressure-increasing device in a state in which the mechanical pressure-increasing device has become incapable of further increasing the hydraulic pressure of the manual hydraulic pressure source, the hydraulic pressure of the manual hydraulic pressure source is supplied to the common passage via the manual-side check valve. In this instance, the hydraulic pressures of the manual hydraulic pressure sources are supplied to the common passage, without the hydraulic pressure being increased.

It is noted that the manual-side check valve may be disposed either inside or outside a housing of the mechanical pressure-increasing device. Where the manual-side check valve is disposed outside the housing of the mechanical pressure-increasing device, the manual-side check valve may be disposed in halfway of a pressure-increasing-device-bypass passage which bypasses the housing of the mechanical pressure-increasing device and which interconnects the output side of the mechanical pressure-increasing device and the manual hydraulic pressure source.

(27) The brake system according to any one of modes (24)-(26), including a selective communication controlling portion configured to cause a selected one of the power hydraulic pressure source and the pressure increasing mechanism to be brought into communication with the common passage.

Since a selected one of the power hydraulic pressure source and the pressure increasing mechanism is brought into communication with the common passage, the hydraulic pressure of the selected one of the power hydraulic pressure source and the pressure increasing mechanism can be supplied to the brake cylinders via the common passage.

(28) A brake system including:

a plurality of hydraulic brakes provided for respective wheels of a vehicle, and configured to be activated by hydraulic pressures of respective brake cylinders thereof so as to restrain rotations of the respective wheels;

a power hydraulic pressure source including a drive source activatable by supply of electric energy thereto, and configured to generate hydraulic pressure by activation of the drive source; and a common passage to which the power hydraulic pressure source and the brake cylinders of the hydraulic brakes are connected, the brake system being characterized in that:

the brake cylinders are grouped into a plurality of brake cylinder groups such that each one of the brake cylinder groups consists of at least one of the brake cylinders, each one of the brake cylinder groups being connected is connected to the common passage via a corresponding one of individual passages that are provided with respective individual control valves;

each of at least one of the individual control valves is a normally-close electromagnetic valve that is to be placed in a closed state when electric current is not being supplied to a solenoid of the each of the at least one of the individual control valves; and each of the other of the individual control valves is a normally-open electromagnetic valve that is to be placed in an open state when electric current is not being supplied to a solenoid of the each of the other of the individual control valves.

The technical features described in any one of above modes (1)-(27) are applicable to the brake system according to this mode (28).

(29) A brake system including:

first and second manual hydraulic pressure sources each of which is configured to generate hydraulic pressure by operation of a brake operating member by an operator;

a plurality of hydraulic brakes provided for respective wheels of a vehicle, and configured to be activated by hydraulic pressures of respective brake cylinders thereof so as to restrain rotations of the respective wheels;

a power hydraulic pressure source including a drive source activatable by supply of electric energy thereto, and configured to generate hydraulic pressure by activation of the drive source; and a common passage to which the power hydraulic pressure source and the brake cylinders of the hydraulic brakes are connected, the brake system being characterized in that:

the brake cylinders include a first brake cylinder connected to the common passage via a first individual passage;

the brake cylinders include a second brake cylinder which is other than the first brake cylinder and which is connected to the common passage via a second individual passage that is other than the first individual passage;

the first individual passage is provided with a first individual control valve, the first individual control valve being a normally-close electromagnetic valve that is to be placed in a closed state when electric current is not being supplied to a solenoid of the first individual control valve;

the second individual passage is provided with a second individual control valve, the second individual control valve being a normally-open electromagnetic valve that is to be placed in an open state when electric current is not being supplied to a solenoid of the second individual control valve;

the first manual hydraulic pressure source is connected, via a first manual passage, to a portion of the first individual passage which is located between the first individual control valve and the first brake cylinder; and the second manual hydraulic pressure source is connected, via a second manual passage, to a portion of the second individual passage which is located between the second individual control valve and the second brake cylinder.

The technical features described in any one of above modes (1)-(28) are applicable to the brake system according to this mode (29).

(30) The brake system according to any one of modes (3)-(29) including a slip control device configured to control a state of slipping of each of the wheels to an appropriate state, wherein the slip control device is configured, when a degree of slipping of at least one of first and second wheels which are provided with the first and second brake cylinders, respectively, is excessively large, to control hydraulic pressure in corresponding at least one of the first and second brake cylinders, by controlling corresponding at least one of the first individual control valve and the second individual control valve.

The first and second individual control valves are subjected to various slip controls such as an anti-lock control, a traction control and a vehicle stability control.

Each of the first and second control valves may be configured to control a difference between hydraulic pressure in an input side of the valve and hydraulic pressure in an output side of the valve, or may be configured to be placed in a selected one of open and closed states. In the former case, an electric current supplied to the solenoid of the valve is controlled, and the pressure difference is made to correspond to an amount of the controlled electric current. In the latter case, the solenoid of the valve is selectively energized and deenergized whereby the valve is selectively opened and closed.

In the brake system described in this mode (30), all of the above-described anti-lock control, traction control and vehicle stability control as the slip controls do not necessarily have to be executed, as long as at least one of these slip controls is executed.

(31) The brake system according to mode (29) or (30), wherein the first and second manual passages are provided with first and second manual-passage cut-off valves, respectively, each of which is a normally-open electromagnetic valve that is to be placed in an open state when electric current is not being supplied to a solenoid thereof.

(32) The brake system according to any one of modes (29)-(31), including:

a manual hydraulic-pressure sensor provided in the first manual passage;

a controlled hydraulic-pressure sensor provided in the common passage; and a brake-operation detecting device configured to detect, based on values detected by the manual hydraulic-pressure sensor and the controlled hydraulic-pressure sensor, generation of hydraulic pressure in each of the first and second manual hydraulic pressure sources.

(33) The brake system according to any one of modes (30)-(32), including an output hydraulic-pressure control device configured to control hydraulic pressure outputted from the power hydraulic pressure source, wherein the second individual control valve is provided between the output hydraulic-pressure control device and the second manual-passage cut-off valve.

(34) The brake system according to any one of modes (29)-(33), including a tandem master cylinder including a housing, first and second pressurizing pistons slidably fitted in the housing and an extension limiting portion provided between the first and second pressurizing pistons, wherein the first manual hydraulic pressure source is a first pressurizing chamber which is defined in the housing and which is located on a front side of the first pressurizing piston, while the second manual hydraulic pressure source is a second pressurizing chamber which is defined in the housing and which is located on a front side of the second pressurizing piston.

(35) The brake system according to any one of modes (29)-(34), including a hydraulic-pressure supply controlling portion configured to control supply of hydraulic pressure to the first and second brake cylinders, by controlling at least the first and second individual control valves and the first and second manual-passage cut-off valves, wherein the hydraulic-pressure supply controlling portion includes a control-valve controlling portion capable of switching between a first state in which the first and second brake cylinders are in communication with the common passage and a second state in which hydraulic pressure is supplied from the common passage to the second brake cylinder while hydraulic pressure is supplied from the first manual hydraulic pressure source to the first brake cylinder, the first state being established by placing each of the first and second manual-passage cut-off valves in the closed state and placing each of the first and second individual control valves in the open state, the second state being established by placing the first manual-passage cut-off valve in the open state, placing the second manual-passage cut-off valve in the closed state, placing the first individual control valve in the closed state, and placing the second individual control valve in the open state.

(36) The brake system according to any one of modes (29)-(35),
wherein the hydraulic brakes are provided for respective front right, front left, rear right and rear left wheels of the vehicle that constitute two pairs of wheels, each pair of the two pairs of wheels being constituted by two of the wheels that are located in respective positions that are diagonal to each other,
wherein the brake cylinders of the hydraulic brakes are connected to the common passage via respective individual passages,
wherein each of two of the individual passages, which are connected to respective two of the brake cylinders provided for respective two of the wheels that constitute one pair of the two pairs of wheels, is provided with a first individual pressure-increasing valve, the first individual pressure-increasing valve being a normally-close electromagnetic valve that is placed in a closed state when electric current is not being supplied to a solenoid thereof,
wherein each of two of the individual passages, which are connected to respective two of the brake cylinders provided for respective two of the wheels that constitute the other pair of the two pairs of wheels, is provided with a second individual pressure-increasing valve, the second individual pressure-increasing valve being a normally-open electromagnetic valve that is placed in an open state when electric current is not being supplied to a solenoid thereof,
wherein the first individual pressure-increasing valve, which is provided in one of the two of the individual passages, corresponds to the first individual control valve,
and wherein the second individual pressure-increasing valve, which is provided in one of the two of the individual passages, corresponds to the second individual control valve.

(37) The brake system according to any one of modes (29)-(36),
wherein the plurality of hydraulic brakes are provided for front right, front left, rear right and rear left wheels of the vehicle,
the brake system including (a) an output hydraulic-pressure control device configured to control hydraulic pressure outputted from the power hydraulic pressure source, (b) a low pressure source and (c) at least one pressure-reducing individual valve each of which is provided between the low pressure source and a corresponding one of the brake cylinders of the hydraulic brakes provided for the respective front right, front left, rear right and rear left wheels of the vehicle,
wherein the output hydraulic-pressure control device includes (i) a pressure-increasing output hydraulic-pressure control valve provided between the power hydraulic pressure source and the common passage and (ii) at least one of the at least one pressure-reducing individual valve.

(38) The brake system according to any one of modes (29)-(37), including (a) a manual hydraulic pressure source that is configured to generate hydraulic pressure by operation of a brake operating member by an operator and (b) a pressure increasing mechanism which is provided between the manual hydraulic pressure source and the common passage and which is configured to increase hydraulic pressure of the manual hydraulic pressure source and to output the increased hydraulic pressure to the common passage.

(39) A brake system including:
first and second manual hydraulic pressure sources each of which is configured to generate hydraulic pressure by operation of a brake operating member by an operator;
a plurality of hydraulic brakes provided for respective wheels of a vehicle, and configured to be activated by hydraulic pressures of respective brake cylinders thereof so as to restrain rotations of the respective wheels;
a power hydraulic pressure source including a drive source activatable by supply of electric energy thereto, and configured to generate hydraulic pressure by activation of the drive source; and
a common passage to which the power hydraulic pressure source and the brake cylinders of the hydraulic brakes are connected,
the brake system being characterized in that:
the brake cylinders include a first brake cylinder connected to the common passage via a first individual passage;
the brake cylinders include a second brake cylinder which is other than the first brake cylinder and which is connected to the common passage via a second individual passage that is other than the first individual passage;
the first individual passage is provided with a first individual control valve, the first individual control valve being a normally-close electromagnetic valve that is to be placed in a closed state when electric current is not being supplied to a solenoid of the first individual control valve;
the second individual passage is provided with a second individual control valve, the second individual control valve being a normally-open electromagnetic valve that is to be placed in an open state when electric current is not being supplied to a solenoid of the second individual control valve;
the first manual hydraulic pressure source is connected, via a first manual passage, to a portion of the first individual passage which is located between the first individual control valve and the first brake cylinder;
the second manual hydraulic pressure source is connected, via a second manual passage, to a portion of the second individual passage which is located between the second individual control valve and the second brake cylinder;
the first manual passage is provided with a first manual-passage cut-off valve which is a normally-open electromagnetic valve that is to be placed in an open state when electric current is not being supplied to a solenoid thereof, and;
the second manual passage is provided with a second manual-passage cut-off valve which is a normally-close electromagnetic valve that is to be placed in a closed state when electric current is not being supplied to a solenoid thereof.

The technical features described in any one of above modes (1)-(38) are applicable to the brake system according to this mode (39).

(40) The brake system according to mode (39), including a hydraulic-pressure supply controlling portion configured to control supply of hydraulic pressure to the first and second brake cylinders, by controlling at least the first and second individual control valves and the first and second manual-passage cut-off valves,
wherein the hydraulic-pressure supply controlling portion includes a control-valve controlling portion capable of switching between a first state in which the first and second brake cylinders are in communication with the common passage and a second state in which hydraulic pressure is supplied from the common passage to the second brake cylinder while hydraulic pressure is supplied from the first manual hydraulic pressure source to the first brake cylinder, the first state being established by placing each of the first and second manual-passage cut-off valves in the closed state and placing each of the first and second individual control valves in the open state, the second state being established by placing the first manual-passage cut-off valve in the open state, placing the second manual-passage cut-off valve in the closed state, placing the first individual control valve in the closed state, and placing the second individual control valve in the open state.

(41) The brake system according to mode (39) or (40),
wherein the hydraulic brakes are provided for respective front right, front left, rear right and rear left wheels of the vehicle that constitute two pairs of wheels, each pair of the two pairs of wheels being constituted by two of the wheels that are located in respective positions diagonal to each other,
wherein the brake cylinders of the hydraulic brakes are connected to the common passage via respective individual passages,
wherein each of two of the individual passages, which are connected to respective two of the brake cylinders provided for respective two of the wheels that constitute one pair of the two pairs of wheels, is provided with a first individual pressure-increasing valve, the first individual pressure-increasing valve being a normally-close electromagnetic valve that is placed in a closed state when electric current is not being supplied to a solenoid thereof,
wherein each of two of the individual passages, which are connected to respective two of the brake cylinders provided for respective two of the wheels that constitute the other pair of the two pairs of wheels, is provided with a second individual pressure-increasing valve, the second individual pressure-increasing valve being a normally-open electromagnetic valve that is placed in an open state when electric current is not being supplied to a solenoid thereof,
wherein the first individual pressure-increasing valve, which is provided in one of the two of the individual passages, corresponds to the first individual control valve,
and wherein the second individual pressure-increasing valve, which is provided in one of the two of the individual passages, corresponds to the second individual control valve.

(42) The brake system according to any one of modes (39)-(41),
wherein the plurality of hydraulic brakes are provided for front right, front left, rear right and rear left wheels of the vehicle,
the brake system including (a) an output hydraulic-pressure control device configured to control hydraulic pressure outputted from the power hydraulic pressure source, (b) a low pressure source and (c) at least one pressure-reducing individual valve each of which is provided between the low pressure source and a corresponding one of the brake cylinders of the hydraulic brakes provided for the respective front right, front left, rear right and rear left wheels of the vehicle,
wherein the output hydraulic-pressure control device includes (i) a pressure-increasing output hydraulic-pressure control valve provided between the power hydraulic pressure source and the common passage and (ii) at least one of the at least one pressure-reducing individual valve.

(43) The brake system according to any one of modes (39)-(42), including (a) a manual hydraulic pressure source that is configured to generate hydraulic pressure by operation of a brake operating member by an operator and (b) a pressure increasing mechanism which is provided between the manual hydraulic pressure source and the common passage and which is configured to increase hydraulic pressure of the manual hydraulic pressure source and to output the increased hydraulic pressure to the common passage.

(44) The brake system according to any one of modes (5)-(43), wherein the first manual passage is provided with one electromagnetic valve that consists of the first manual-passage cut-off valve, while the second manual passage is provided with one electromagnetic valve that consists of the second manual-passage cut-off valve.

MODES FOR CARRYING OUT THE INVENTION

Figure 1:
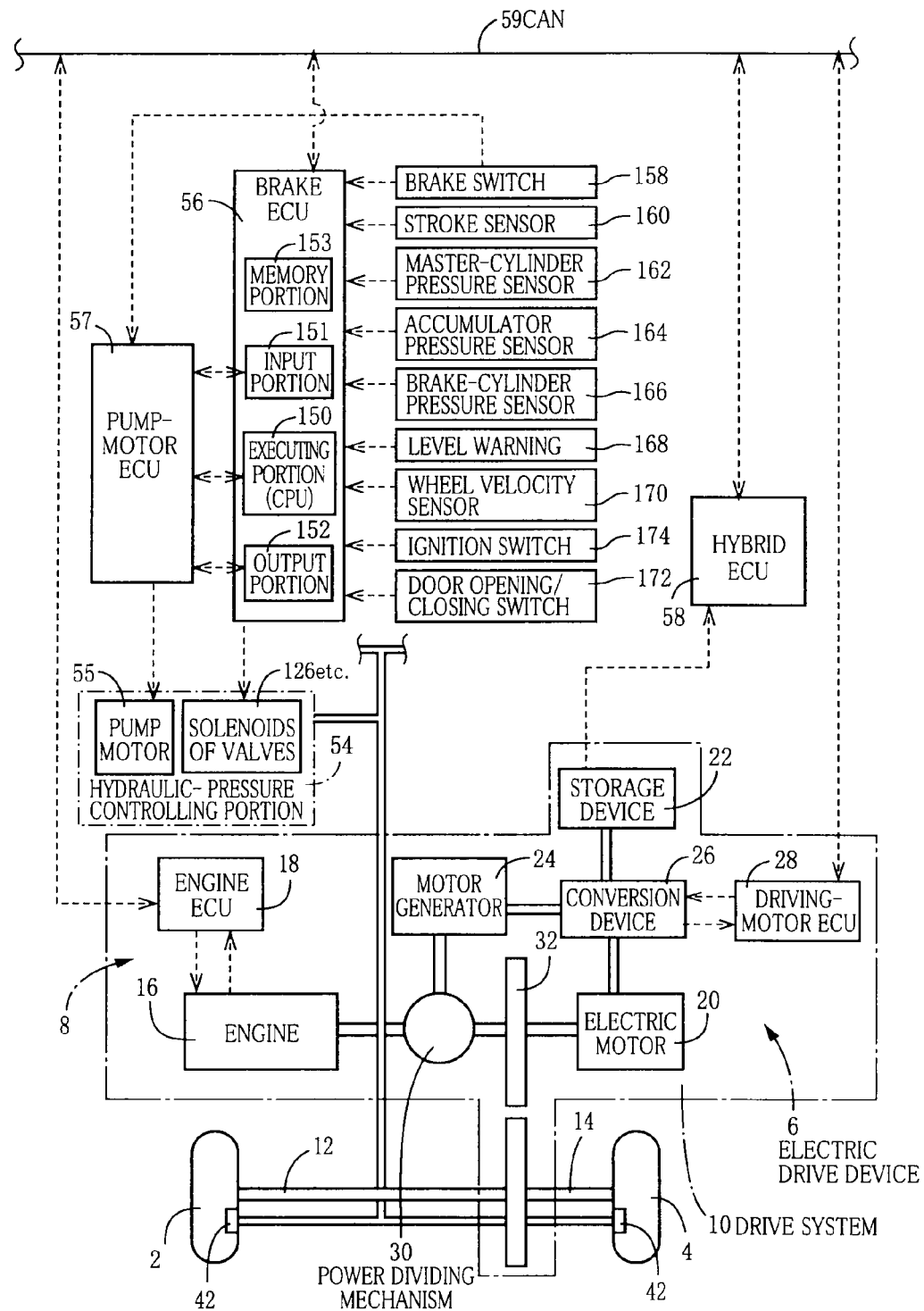
FIG. 1 is a view schematically showing an entirety of a vehicle in which a hydraulic brake system according to an embodiment 1 of the present invention is installed.

Hereinafter, a brake system as an embodiment of the present invention will be described with reference to drawings.

Embodiment 1

<Vehicle>

There will be first described a vehicle on which a hydraulic brake system as the brake system according to the embodiment 1 is installed.

This vehicle is a hybrid vehicle including driving units in the form of an electric motor and an engine, so that front right and left wheels 2, 4 as drive wheels are to be driven by a drive system 10 including an electric drive device 6 and an internal-combustion drive device 8. A drive power of the drive system 10 can be transmitted to the front right and left wheels 2, 4 via drive shafts 12, 14. The internal-combustion drive device 8 includes an engine 16 and an engine ECU 18 that is configured to control activation of the engine 16. The electric drive device 6 includes a driving electric motor (hereinafter referred to as a driving motor) 20, a storage device 22, a motor generator 24, a conversion device 26, a driving-motor ECU 28 and a power dividing mechanism 30. The driving motor 20, motor generator 24, engine 16 and power dividing mechanism 30 (to which the driving motor 20, motor generator 24 and engine 16 are connected) are controlled so as to selectively establish a state in which only a driving torque of the driving motor 20 is transmitted to an output member 32, a state in which a driving torque of the engine 16 and the driving torque of the driving motor 20 are both transmitted to the output member 32, and a state in which an output of the engine 16 is outputted to the motor generator 24 and the output member 32. The driving force transmitted to the output member 32 is transmitted to the drive shafts 12, 14 via a speed reducer and differential gears.

The conversion device 26 includes an inverter, and is controlled by the driving-motor ECU 28. With electric current control of the inverter, the conversion device 26 selectively establishes at least a driving state in which the driving motor 20 is rotated by electric energy supplied from the storage device 22 to the driving motor 20 and a charging state in which the conversion device 26 serves as a generator upon regenerative braking so as to charge the storage device 22 with electric energy. During the charging state, a regenerative braking torque is applied to each of the front right and left wheels 4, 2. In this sense, the electric drive device 6 can be considered as a regenerative braking device.

The hydraulic brake system includes brake cylinders 42 of respective hydraulic brakes 40 provided for the respective front right and left wheels 2, 4, brake cylinders 52 of respective hydraulic brakes 50 provided for the respective rear right and left wheels 46, 48 (see FIG. 2), and a hydraulic-pressure controlling portion 54 configured to control hydraulic pressures of the respective brake cylinders 42, 52. As described below, the hydraulic-pressure controlling portion 54 includes a plurality of electromagnetic valves and a pump motor 55 as a drive source of power hydraulic pressure source which is to be driven by supply of electric energy to the pump motor 55, so that a solenoid of each of the plurality of electromagnetic valves is controlled based on commands of a brake ECU 56 that is constituted principally by a computer while the pump motor 55 is controlled based on commands of a pump-motor ECU 57.

Further, the vehicle is provided with a hybrid ECU 58. The hybrid ECU 58, brake ECU 56, engine ECU 18 and driving-motor ECU 28 are connected to one another via CAN (car area network) 59, so that these ECUs 58, 56, 18, 28 are communicable to one another, and required information are transmitted among the ECUs 58, 56, 18, 28 as needed.

The present hydraulic brake system is installable on not only a hybrid vehicle but also a plug-in hybrid vehicle, an electric vehicle and a fuel battery vehicle. In an electric vehicle, the internal-combustion drive device 8 is not required. In a fuel battery vehicle, the driving motor is driven by, for example, a fuel battery stack.

Further, the present hydraulic brake system is installable also on an internal-combustion drive vehicle. In such a vehicle not equipped with the electric drive device 6, a regenerative braking torque is not applied to the driving wheels 2, 4 so that a regenerative cooperative control is not executed.

Further, to elements included in the present hydraulic brake system, electric energy is supplied from a common electric power source (e.g., storage device 22).

<Hydraulic Brake System>

The hydraulic brake system will be next described. In the following description, each of the brake cylinders, hydraulic brakes and electromagnetic valves will be referred together with, as a suffix, one of reference signs (FR, FL, RR, RL) indicative of the respective front right, front left, rear right and rear left wheels, where it should be clarified which one of the four wheels the referred brake cylinder, hydraulic brake or electromagnetic valve corresponds to. However, each of the brake cylinders, hydraulic brakes and electromagnetic valves will be referred without such reference signs, where it is referred to as a representative of those provided for the four wheels, or where the above-described clarification is not required.

Figure 2:
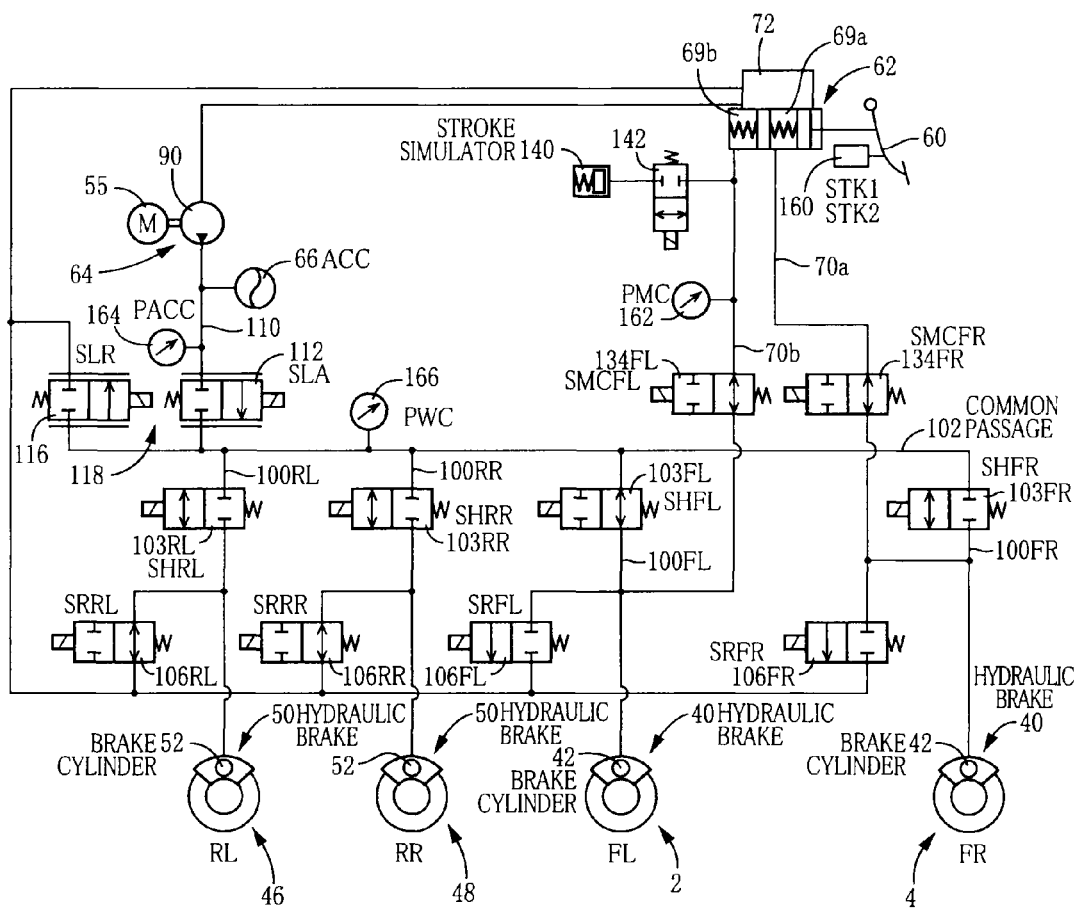
FIG. 2 is a diagram of a hydraulic circuit of the hydraulic brake system.

The present brake system includes a brake circuit shown FIG. 2 in which reference sign "60" denotes a brake pedal as a brake operating member, reference sign "62" denotes a master cylinder as manual hydraulic pressure sources which is configured to generate hydraulic pressure by operation of the brake pedal 60, and reference sign "64" denotes a power hydraulic pressure source including a pump device 65 and an accumulator 66. The hydraulic brakes 40, 50 are to be activated by hydraulic pressures of the respective brake cylinders 42, 52. In the present embodiment, each of the hydraulic brakes 40, 50 is a disk brake.

It is noted that each of the hydraulic brakes 40, 50 may be a drum brake. It is further noted that each of the hydraulic brakes 40 provided for the front wheels 2, 4 may be a disk brake while each of the hydraulic brakes 50 provided for the rear wheels 46, 48 may be a drum brake.

Figure 3:
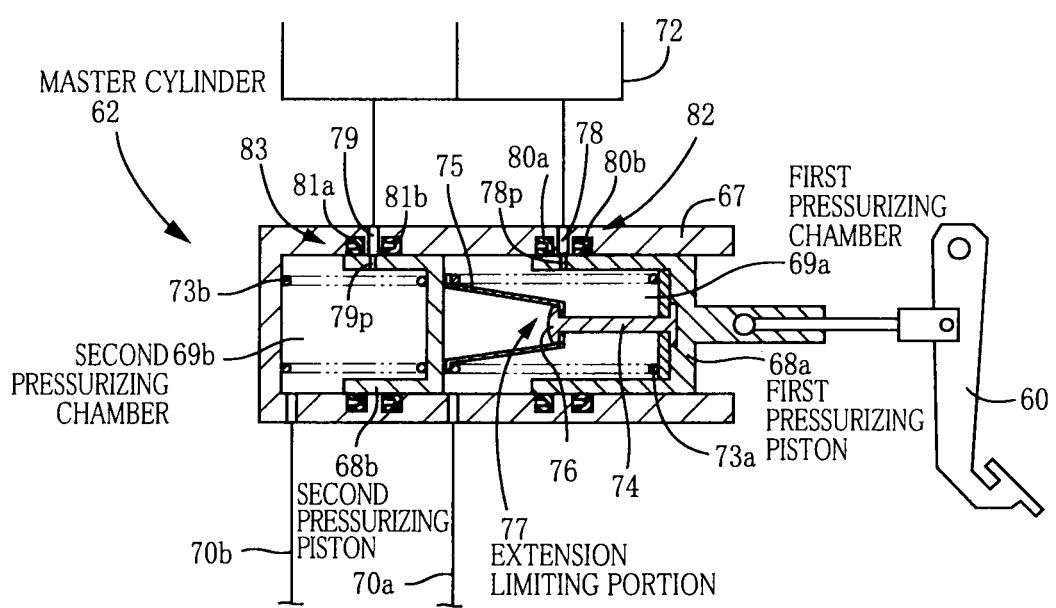
FIG. 3 is a cross sectional view showing a master cylinder that is included in the hydraulic brake system.

As shown in FIG. 3, the master cylinder 62 is a tandem cylinder including (a) a housing 67 and (b) first and second pressurizing pistons 68a, 68b slidably fitted in the housing 67. The master cylinder 62 has first and second pressurizing chambers 69a, 69b such that the first pressurizing chamber 69a is located on a front side of the first pressurizing piston 68a while the second pressurizing chamber 69b is located on a front side of the second pressurizing piston 68b. In the present embodiment, the first and second pressurizing chambers 69a, 69b serve as first and second manual hydraulic pressure sources, respectively. Further, to the first and second pressurizing chamber 69a, 69b, the brake cylinders 42FR, 42FL as first and second brake cylinders are connected via first and second master cylinder passages 70a, 70b, respectively.

In the present embodiment, the first and second master cylinder passages 70a, 70b correspond to first and second manual passages, respectively, and the brake cylinder 42FR of the hydraulic brake 40FR provided for the front right wheel 4 and the brake cylinder 42FL of the hydraulic brake 40FL provided for the front left wheel 2 correspond to first and second brake cylinders, respectively.

Further, the first and second pressurizing chambers 69a, 69b are brought into communication with a reservoir 72 as a low pressure source, when the first and second pressurizing pistons 68a, 68b reach respective reverse end positions. The reservoir 72 defines therein an inside space that is partitioned into a plurality of storage chamber configured to store therein working fluid. The storage chambers of the reservoir 72 are connected to the pressurizing chambers 69a, 69b and the pump device 65.

A return spring 73a is disposed between the first and second pressurizing pistons 68a, 68b, while a return spring 73b is disposed between a bottom portion of the housing 67 and the second pressurizing chamber 68b, so that the first and second pressurizing pistons 68a, 68b are biased by the return springs 73a, 73b, respectively, in a backward direction. The first pressurizing piston 68a is associated with the brake pedal 60, and is moved in a forward direction when a depression force as an operating force is applied to the brake pedal 60.

Further, a pin 74 is fixedly disposed on a forward side portion of the first pressurizing piston 68a while a retainer 75 is disposed on a backward side portion of the second pressurizing piston 68b. The pin 74 is engaged with the retainer 75, such that the pin 74 is movable relative to the retainer 75 whereby the first and second pressurizing pistons 68a, 68b are movable relative to each other.

With a head portion (engaging portion) 76 of the pin 74 being brought into contact with an engagement portion of the retainer 75, backward movement of the first pressurizing piston 68a relative to the second pressurizing piston 68b is limited, in other words, forward movement of the second pressurizing piston 68b relative to the first pressurizing piston 68a is limited. In the present embodiment, an extension limiting portion 77 is constituted by the pin 74 and the retainer 75, for example.

In a tubular portion of the housing 67, reservoir ports 78, 79 are provided so as to be held in communication with the reservoir 72. A communication hole 78p is provided in a portion of the first pressurizing piston 68a, which is aligned with the reservoir port 78 when the first pressurizing piston 68a is being positioned in the reverse end position. A communication hole 79p is provided in a portion of the second pressurizing piston 68b, which is aligned with the reservoir port 79 when the second pressurizing piston 68b is being positioned in the reverse end position. Further, a pair of cup seals 80a, 80b are provided in respective portions of the housing 67 that are located on front and rear sides of the reservoir port 78, respectively, while a pair of cup seals 81a, 81b are provided in respective portions of the housing 67 that are located on front and rear sides of the reservoir port 79, respectively. When the first and second pressurizing pistons 68a, 68b are being positioned in the respective reverse end positions, the communication holes 78p, 79p are opposed to the reservoir ports 78, 79, respectively, so that the first and second pressurizing chamber 69a, 69b are held in communication with the reservoir 72. When the first and second pressurizing pistons 68a, 68b are moved in the forward direction, the first and second pressurizing chambers 69a, 69b become isolated from the reservoir 72, so that hydraulic pressure dependent on the depression force applied to the brake pedal 60 is generated in each of the first and second pressurizing chambers 69a, 69b. In the present embodiment, the reservoir port 78, communication hole 78p and cup seals 80a, 80b cooperate to constitute a reservoir cut-off valve 82, while the reservoir port 79, communication hole 79p and cup seals 81a, 81b cooperate to constitute a reservoir cut-off valve 83.

It is noted that the biasing force (set load, spring constant) of the return spring 73b is smaller than that of the return spring 73a.

In the power hydraulic pressure source 64, the pump device 65 includes a pump 90 and the pump motor 55, so that the working fluid is pumped from the reservoir 72 by activation of the pump 90, and the pumped working fluid is accumulated in the accumulator 66. The pump motor 55 is controlled based on commands supplied from the pump-motor ECU 57 such that the pressure of the working fluid accumulated in the accumulator 66 is held within a predetermined range. The brake ECU 56 supplies information indicating that the accumulator pressure becomes lower than a lower limit of the predetermined range and that the accumulator pressure reaches an upper limit of the predeterminé range (or information representing an amount of the accumulator pressure), to the pump motor ECU 57, so that the pump motor 55 is controlled based on the supplied information.

On the other hands, the brake cylinders 42FR, 42FL provided for the front right and left wheels 2, 4 and the brake cylinders 52RR, 52RL provided for the rear right and left wheels 46, 48 are connected to a common passage 102 via respective individual passages 100FR, 100FL, 100RR, 100RL, respectively.

The individual passages 100FR, 100FL, 100RR, 100RL are provided with respective pressure holding valves (SHij: i=F, R; j=L, R) 103FR, 103FL, 103RR, 103RL. Between the brake cylinders 42FR, 42FL, 52RR, 52RL and the reservoir 72, there are disposed pressure reducing valves (SRij: i=F, R; j=L, R) 106FR, 106FL, 106RR, 106RL.

The pressure holding valve 103FL provided for the front left wheel 2 is a normally-open electromagnetic valve that is to be placed in an open state when electric current is not being supplied to a solenoid thereof. Each of the other pressure holding valves 103FR, 103RR, 103RL provided for the front right, rear right and rear left wheels 4, 48, 46, respectively, is a normally-close electromagnetic valve that is to be placed in a closed state when electric current is not being supplied to a solenoid thereof.

Each of the pressure reducing valves 106FR, 106FL provided for the front right and left wheels 2, 4 is a normally-close electromagnetic valve, while each of the pressure reducing valves 106RL, 106RR provided for the rear right and left wheels 48, 46 is a normally-open electromagnetic valve.

In the present embodiment, the individual passage 100FR corresponds to a first individual passage while the individual passage 100FL corresponds to a second individual passage. Further, the pressure holding valve 103FR provided for the front right wheel 4 corresponds to a first individual control valve while the pressure holding valve 103FL provided for the front left wheel 2 corresponds to a second individual control valve.

To the common passage 102 to which the brake cylinders 42, 52 are connected, the power hydraulic pressure source 64 is also connected via a controlled-pressure passage 110.

The controlled-pressure passage 110 is provided with a pressure-increasing linear control valve (SLA) 112. A pressure-reducing linear control valve (SLR) 116 is provided between the controlled-pressure passage 110 and the reservoir 72. With the pressure-increasing linear control valve 112 and pressure-reducing linear control valve 116 being controlled, the hydraulic pressure outputted by the power hydraulic pressure source 64 is controlled, and the controlled hydraulic pressure is supplied to the common passage 102. The pressure-increasing linear control valve 112 and the pressure-reducing linear control valve 116 cooperate to constitute an output hydraulic-pressure control valve device 118. Further, each of the pressure-increasing linear control valve 112 and pressure-reducing linear control valve 116 may be referred to as an output hydraulic-pressure control valve. Each of the pressure-increasing linear control valve 112 and pressure-reducing linear control valve 116 is a normally-close electromagnetic valve which is to be placed in a closed state when electric current is not being supplied to a solenoid thereof, and which is configured to output hydraulic pressure whose amount is continuously controlled by continuously controlling an amount of the electric current supplied to the solenoid.

Figure 4A:
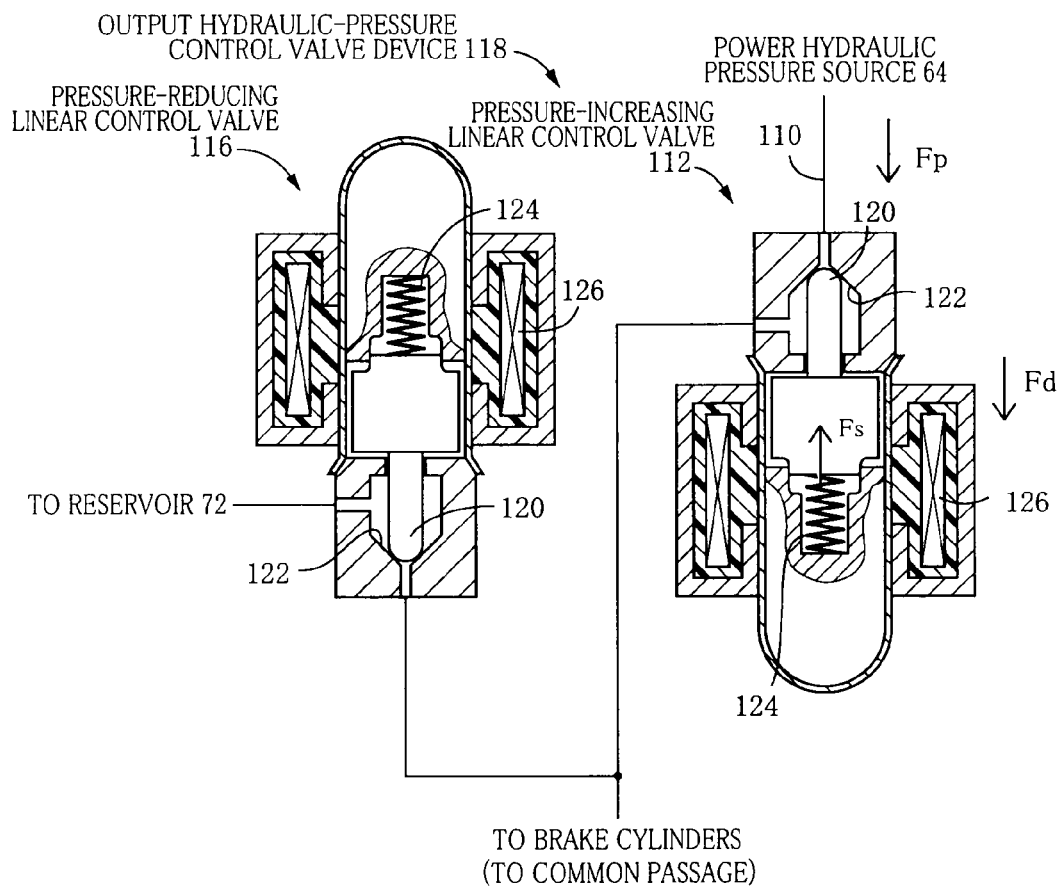
FIG. 4A is a cross sectional view showing a pressure-increasing linear control valve and a pressure-reducing linear control valve that are included in the hydraulic brake system.
Figure 4B:
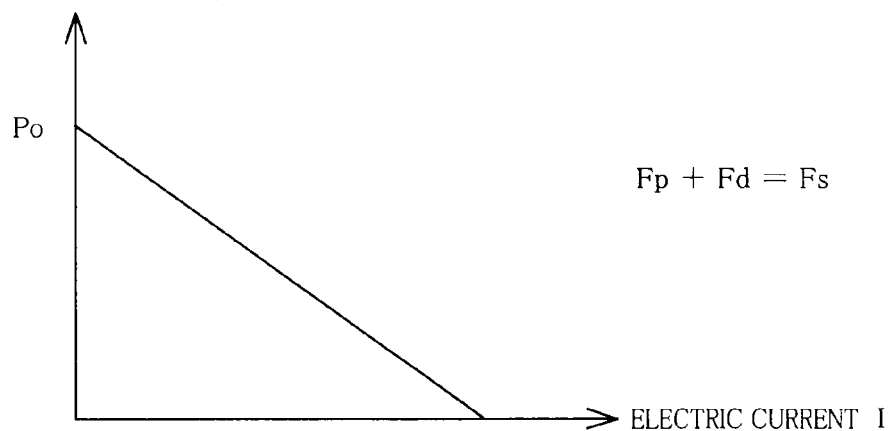
FIG. 4B is a view showing a valve opening characteristic of each of the pressure-increasing linear control valve and the pressure-reducing linear control valve.

As shown in FIG. 4 (a), each of the pressure-increasing linear control valve 112 and pressure-reducing linear control valve 116 includes a valve body 120, a valve seat 122 (that cooperates with the valve body 120 to constitute a seating valve), a spring 124 and a solenoid 126. The spring 124 generates a biasing force Fs forcing the valve body 120 in a direction toward the valve seat 122. The solenoid 126, when electric current is being applied thereto, generates a driving force Fd forcing the valve body 120 in a direction away from the valve seat 122. Further, in the pressure-increasing linear control valve 112, a pressure-difference-based force Fp, which is generated based on a difference between pressure in the power hydraulic pressure source 64 and pressure in the common passage 102, acts on the valve body 120, forcing the valve body 120 to be displaced in a direction away from the valve seat 122. In the pressure-reducing linear control valve 116, a pressure-difference-based force Fp, which is generated based on a difference between pressure in the common passage 102 (controlled-pressure passage 110) and pressure in the reservoir 72, acts on the valve body 120, forcing the valve body 120 to be displaced in a direction away from the valve seat 122 (Fd+Fp: Fs). In each of the valves 112, 116, the pressure-difference-based force Fp is controlled by controlling the electric current that is supplied to the solenoid 126, whereby the hydraulic pressure in the common passage 102 is controlled.

FIG. 4 (b) shows a characteristic of the pressure-increasing linear control valve 112, which is a relationship between the supply current I (supplied to the solenoid 126) and a valve opening pressure. From FIG. 4 (b), it is understood that the pressure difference, which is required for causing the pressure-increasing linear control valve 112 to be switched from the closed state to the open state, is higher when the supply current I is small than when the supply current I is large. Further, from FIG. 4 (b), it is understood that, where the electric current is not being supplied to the solenoid 126, the pressure-increasing linear control valve 112 can be switched from the closed state to the open state, when the pressure difference becomes higher than the valve opening pressure Po. In this sense, while the electric current is not being supplied to the solenoid 126, it can be considered that the pressure-increasing linear control valve 112 functions as a relief valve.

It is noted that the pressure-reducing linear control valve 116 has substantially the same characteristics as the pressure-increasing linear control valve 112.

On the other hand, the first master cylinder passage 70a is connected to a portion of the individual passage 100FR provided for the front right wheel 4, which portion is located on a downstream side of the pressure holding valve 103FR, namely, is portion is located between the pressure holding valve 103FR and the brake cylinder 42FR. Meanwhile, the second master cylinder passage 70b is connected to a portion of the individual passage 100FL provided for the front left wheel 2, which portion is located on a downstream side of the pressure holding valve 103FL, namely, is portion is located between the pressure holding valve 103FL and the brake cylinder 42FL. That is, each of the first and second master cylinder passages 70a, 70b is connected directly to a corresponding one of the brake cylinders 42FR, 42FL, without each of the first and second master cylinder passages 70a, 70b being connected to the common passage 102.

A first master cut-off valves (SMCFR) 134FR is provided on a midway of the first master cylinder passage 70a, while a second master cut-off valves (SMCFL) 134FL is provided on a midway of the second master cylinder passage 70b. The first and second master cut-off valves 134FR, 134FL, each of which is a normally-open electromagnetic valve, correspond to first and second manual-passage cut-off valves, respectively.

Further, a stroke simulator 140 is connected to the second master cylinder passages 70b via a simulator controlling valve 142 that is a normally-close electromagnetic valve. Since the set load of the return spring 73b is smaller than the set load of the return spring 73b, as described above, the return spring 73b is first compressed when the operating force is applied to the brake pedal 60. Therefore, the stroke simulator 140 is provided in the second master cylinder passage 70b that is connected to the second pressurizing chamber 69b.

In the present embodiment, as described above, the above-described pump motor 55, output hydraulic-pressure control valve device 118, master cut-off valves 134, pressure holding valve 103 and pressure reducing valves 106 cooperate to constitute the hydraulic-pressure controlling portion 54.

As shown in FIG. 1, the brake ECU 56 is constituted principally by a computer including an executing portion (CPU) 150, an input portion 151, an output portion 152 and a memory portion 153. To the input portion 152, there are connected, for example, a brake switch 158, a stroke sensor 160, a master-cylinder pressure sensor 162 as a manual hydraulic-pressure sensor, an accumulator pressure sensor 164, a brake-cylinder pressure sensor 166, a level warning switch 168, a wheel velocity sensor 170, a door opening/closing switch 172 and an ignition switch 174.

The brake switch 158 is a switch, which is turned from its OFF state to its ON state when the brake pedal 60 is operated. In the present embodiment, the brake switch 158 is placed in its ON state when the brake pedal 60 is advanced from the reverse end position by a predetermined amount or more than the predetermined amount.

The stroke sensor 160 is configured to detect an operating stroke (STK) of the brake pedal 60. In the present embodiment, the stroke sensor 160 is constituted by two sensor switches both of which are configured to detect the operating stroke of the brake pedal 60 (i.e., deviation of the brake pedal 60 from the reverse end position). Thus, the stroke sensor 160 has two systems, so that the stroke can be detected by one of the two sensor switches even in the event of failure of the other of the two sensor switches.

The master-cylinder pressure sensor 162 is provided in the second master cylinder passages 70b, and is configured to detect the hydraulic pressure in the second pressurizing chamber 69b of the master cylinder 62. Since the set load of the return spring 73b is smaller than the set load of the return spring 73a, as described above, the return spring 73b is compressed earlier than the return spring 73a, so that the hydraulic pressure in the second pressurizing chamber 69b is increased earlier than the hydraulic pressure in the first pressuring chamber 69a. Thus, by the providing the master-cylinder pressure sensor 162 in the second master cylinder passage 70b, it is possible to restrain delay of detection of the hydraulic pressure in the master cylinder 62.

The accumulator pressure sensor 164 is configured to detect pressure (PACC) of working fluid accumulated in the accumulator 66.

The brake-cylinder pressure sensor 166 is provided in the common passage 102, and is configured to detect pressure (PWC) in the brake cylinders 42, 52. When each of the pressure holding valves 103 is placed in the open state, the common passage 102 is held in communication with each of the brake cylinders 42, 52, so that the hydraulic pressure in each of the brake cylinders 42, 52 can be made equal to the hydraulic pressure in the common passage 102. Further, when the pressure holding valve (second individual control valve) 103FL and the second master cut-off valves 134FL are placed in the open states, as shown in FIG. 2, the brake-cylinder pressure sensor 166 can detect the hydraulic pressure in the second pressurizing chamber 69b of the master cylinder 62. Further, the brake-cylinder pressure sensor 166 may be also referred to as a controlled hydraulic-pressure sensor, since the hydraulic pressure of the power hydraulic pressure source 64, which is controlled by the output hydraulic-pressure control valve device 118, is supplied to the common passage 102 that is provided with the brake-cylinder pressure sensor 166.

The level warning switch 168 is a switch which is to be turned to the OFF state when the working fluid reserved in the reservoir 72 becomes not larger than a predetermined amount. In the present embodiment, when the amount of the working fluid reserved in one of the plurality of chambers of the reservoir 72 becomes not larger than a predetermined amount, the level warning switch 168 is turned to the OFF state.

The wheel velocity sensor 170 is provided for each of the front right wheel 4, front left wheel 2, rear right wheel 48 and rear left wheel 46, so as to detect rotational velocity of each of the wheels. A running velocity of the vehicle is obtained based on the rotational velocities of the four wheels.

The door opening/closing switch 172 is configured to detect opening and closing of a door of the vehicle. The switch 172 may be configured to either detect the opening/closing of a door of a vehicle-operator side or detect the opening/closing of any one of the other doors. The door opening/closing switch 172 may be constituted by a door courtesy lamp switch of the vehicle.

The ignition switch (IGSW) 174 is a main switch of the vehicle.

Further, to the output portion 152, there are connected, for example, the pump-motor ECU 57 and solenoids of all of the electromagnetic valves (hereinafter simply referred to as "all the electromagnetic valves" where appropriate) which are included in the brake circuit such as the pressure-increasing linear control valve 112, pressure-reducing linear control valve 116, pressure holding valves 103, pressure reducing valves 106, master cut-off valves 134 and simulator controlling valve 142.

Moreover, the memory portion 153 stores therein, for example, various programs and tables.

The pump-motor ECU 57 is also constituted by a computer including an executing portion, a memory portion, an input portion and an output portion. To the input portion, there are connected the above-described input portion 151, output portion 152 and CPU 150 of the brake ECU 56 and the brake switch 158. To the output portion 152, a drive circuit (not shown) of the pump motor 55 is connected.

In the pump-motor ECU 57, states of the input portion 151, output portion 152 and CPU 150 of the brake ECU 56 (e.g., electric signals representing electric current value and voltage value) are detected, and it is judged whether or not each of these components is activated normally.

As described below, the pump-motor ECU 57 is configured to control the pump motor 55, for example, in the event of failure of the brake ECU 56. The pump-motor ECU 57 is configured to start controlling the pump motor 55 upon satisfaction of failure-state control starting condition. This failure-state control starting condition is satisfied, for example, (1) when the pump-motor ECU 57 receives, from the brake ECU 56, information representing failure of the control system of the brake system, during the ON state of the brake switch 158, and (2) when the brake ECU 56 is not activated normally (e.g., in the event of failure of the brake ECU 56 as such, in the event of breaking of the signal wires between the brake ECU 56 and the sensors, and in the event of breaking of the signal wires between the brake ECU 56 and the solenoids of the valves), during the ON state of the brake switch 158.

<Initial Checks>

In the present embodiment, checks are carried out upon satisfaction of a predetermined check starting condition. This check starting condition is satisfied, for example, when the door opening/closing switch 172 is turned to the ON state, and when a brake operation is carried out for the first time after the ignition switch 174 has been turned to the ON state.

Figure 5:
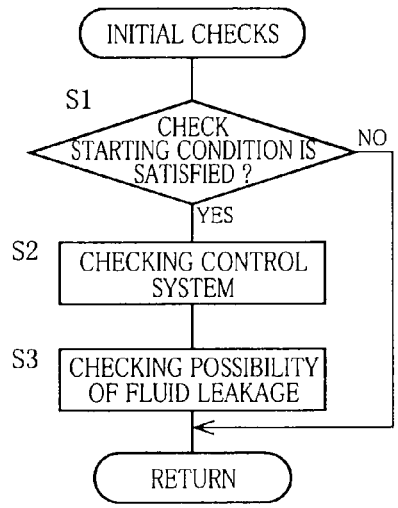
FIG. 5 is a flow chart representing an initial-check program stored in a memory portion of a brake ECU that is included in the hydraulic brake system.

FIG. 5 is a flow chart showing an initial checking program that is executed at a predetermined time interval. The execution of this initial checking program is initiated with step S1 that is implemented to judge whether the predetermined check starting condition is satisfied or not. When the check starting condition is satisfied, step S2 is implemented to check the control system, and step S3 is implemented to check possibility of fluid leakage. The control system includes components, such as the sensors and the electromagnetic valves, which are used for controlling the hydraulic pressure in each of the brake cylinders.

For detecting failure of the control system, for example, it is judged whether or not there is a breaking of wire for each of all the electromagnetic valves, and it is judged whether or not there is a breaking of wire for each of all the sensors (e.g., brake switch 158, stroke sensor 160, master-cylinder pressure sensor 162, accumulator pressure sensor 164, brake-cylinder pressure sensor 166, wheel velocity sensor 170).

The possibility of the fluid leakage is checked, for example, when the ignition switch 174 is turned to the ON state, and when the brake operation is carried out. It is judged that there is no fluid leakage, for example, (a) when the level warning switch 168 is in the ON state, and (b) when there is established a predetermined relationship between the stroke of the brake pedal 60 and the hydraulic pressure in the master cylinder 62 upon execution of the brake operation. On the other hand, it is judged that there is a possibility of fluid leakage, when the hydraulic pressure in the master cylinder 62 is low relative to the stroke of the brake pedal 60. Further, it is judged that there is a possibility of fluid leakage, (c) when a value detected by the accumulator pressure sensor 164 does not reach a fluid-leakage-judgment threshold value even after continuation of activation of the pump 90 for a predetermined length of time, (d) when the value detected by the brake-cylinder pressure sensor 164 is low relative to a value detected by the master-cylinder pressure sensor 162 while the regenerative cooperative control is not being carried out, and (e) when it was judged that there was a possibility of fluid leakage upon previous brake activation (when the hydraulic pressure in the master cylinder 62 was supplied to the brake cylinders 42 for the front right and left wheels 4, 2, while the pump pressure was supplied to the brake cylinders 52 for the rear right and left wheels 48, 46).

Thus, in the present embodiment, the possibility of the fluid leakage is detected based on the above-described conditions (a)-(e). There is a case where a fluid leakage does not actually take place even when it is judged that there is a possibility of the fluid leakage, because the above-described conditions (b)-(e) could be satisfied by a factor other than the fluid leakage. Further, there is a case where an amount of the fluid leakage is small when the fluid leakage actually takes place. However, even in these cases, it is judged that there is a possibility of the fluid leakage, because it is not possible to assert that there is no possibility of the fluid leakage.

<Brake Hydraulic Pressure Control>

Figure 6:
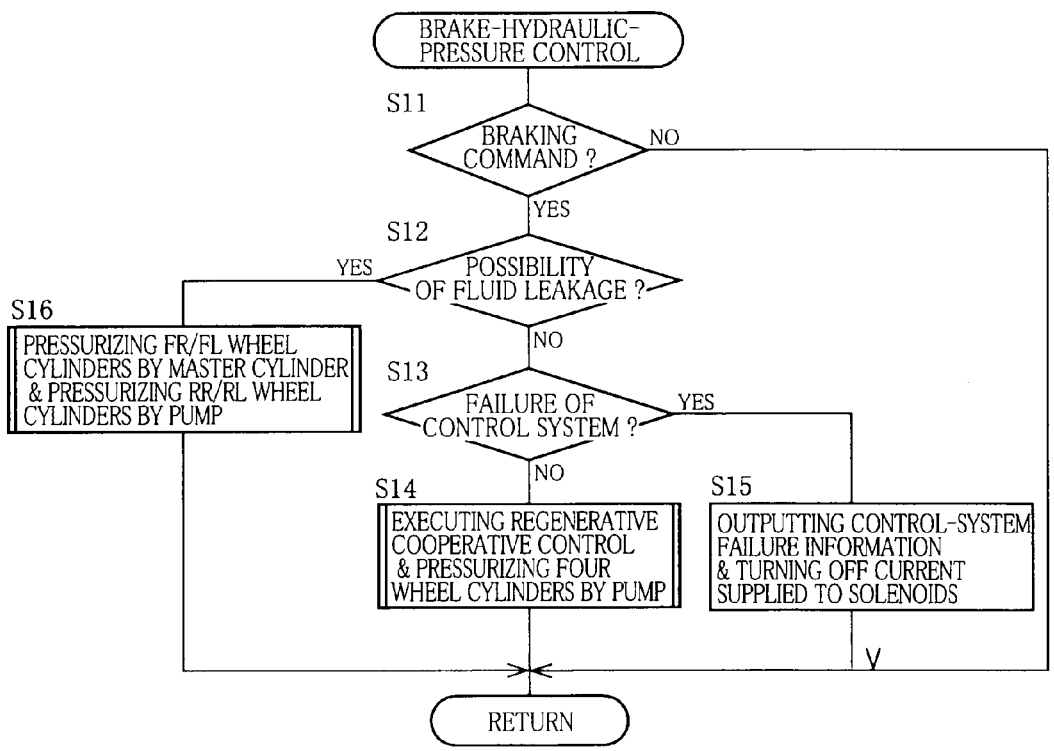
FIG. 6 is a flow chart representing a brake-hydraulic-pressure control program stored in the memory portion of the brake ECU.

Then, the hydraulic pressures in the brake cylinders 42, 52 are controlled based on result of the above-described initial checks. FIG. 6 is a flow chart representing a brake-hydraulic-pressure controlling program that is executed at a predetermined time interval.

In step S11, it is judged whether a braking command is issued or not. A positive judgment (YES) is obtained in step S11, for example, when the brake switch 158 is in the ON state, and when a command requesting activation of an automatic brake is issued. Since there is a case where the automatic brake is activated upon execution of a traction control and upon execution of a vehicle stability control, it is judged that the braking command is issued upon satisfaction of conditions required for starting the traction control and the vehicle stability control.

When it is judged that the braking command is issued, the control flow goes to steps S12 and S13 that are implemented to read results of the judgment as to whether or not there is a possibility of the fluid leakage and the judgment as to whether or not the control system suffers from the failure.

When negative judgments (NO) are obtained in both of these judgments, namely, when the brake system functions normally (i.e., when it is judged that the control system functions normally and that there is no possibility of the fluid leakage), the control flow goes to step S14 that is implemented to carry out a regenerative cooperative control.

When it is judged that the control system suffers from the failure, namely, when a positive judgment (YES) is obtained in step S13, the control flow goes to step S15 in which supply of the electric current to the solenoids of all the electromagnetic valves is stopped so that all the electromagnetic valves are placed in the respective original positions as shown in FIG. 2. Further, in step S15, information representing the failure of the control system is supplied to the pump-motor ECU 57.

When it is judged that there is a possibility of the fluid leakage, namely, when a positive judgment (YES) is obtained in step S12, the control flow goes to step S16 in which the hydraulic pressure in the master cylinder 62 is supplied to the brake cylinders 42 for the front right and left wheels 4, 2 while the hydraulic pressure controlled by the output hydraulic-pressure control valve device 118 is supplied to the brake cylinders 52 for the rear right and left wheels 48, 46.

It is rare that the control system suffers from the failure and also there is a possibility of the fluid leakage. Therefore, when it is judged that there is a possibility of the fluid leakage, it is regarded that the control system functions normally thereby making it possible to control the electromagnetic valves and to activate the pump motor 55.

In the present embodiment, the automatic brake is not activated, when it is judged that the control system suffers from the failure and when it is judged that there is a possibility of the fluid leakage.

Further, in the event of failure of the brake system as a whole, for example, in case of failure of supply of electric energy due to break down of the power supply voltage, the pump motor 55 is stopped and the electromagnetic valves are placed in the respective original positions.

1) In Case of Normality of System

To the brake cylinders 42, 52 for the four wheels 4, 2, 48, 46, the controlled hydraulic pressure (i.e., fluid pressurized by the pump) is supplied from the power hydraulic pressure source 64, so that the regenerative cooperative control is in principle executed.

The regenerative cooperative control is executed for equalizing an actual total braking torque to a total required braking torque, wherein the actual total braking torque is a sum of the regenerative braking torque applied to the driving wheels 2, 4 and a friction braking torque applied to the driven wheels 46, 48 as well as to the driving wheels 2, 4.

The total required braking torque corresponds to a braking torque required by the vehicle operator, when the total required braking torque is obtained based on values detected by the stroke sensor 160 and the master-cylinder pressure sensor 162. The total required braking torque corresponds to a braking torque required in the traction control or vehicle stability control, when the total required braking torque is obtained based on a running state of the vehicle. Then, a required regenerative braking torque is determined based on the above-described total required braking torque and information which is supplied from the hybrid ECU 58 and which contains data indicative of a generator-side upper limit value and a storage-side upper limit value. The generator-side upper limit value is an upper limit value of the regenerative braking torque, which is dependent on, for example, number of rotations of the driving motor 20, while the storage-side upper limit value is an upper limit value of the regenerative braking torque, which is dependent on, for example, a storage capacity of the storage device 22. That is, the smallest one of the total required braking torque (required value), generator side upper limit value and storage-side upper limit value is determined as the required regenerative braking torque, and then information representing the determined required regenerative braking torque is supplied to the hybrid ECU 58.

The hybrid ECU 58 supplies information representing the required regenerative braking torque, to the driving-motor ECU 28. Then, the driving-motor ECU 28 supplies a control command to the conversion device 26 such that the braking torque applied to the front right and left wheels 4, 2 by the driving motor 20 is made equal to the required regenerative braking torque. In this instance, the driving motor 20 is controlled by the conversion device 26.

The driving-motor ECU 28 supplies information representing activation state of the driving motor 20 such as an actual number of revolutions, to the hybrid ECU 58. In the hybrid ECU 58, an actual regenerative braking torque is obtained based on the actual activation state of the driving motor 20, and information representing a value of the actual regenerative braking torque is supplied to the brake ECU 56.

The brake ECU 56 determines a required hydraulic braking torque based on, for example, a value obtained by subtracting the actual regenerative braking torque from the total required braking torque, and then controls valves such as the pressure-increasing linear control valve 112 and pressure-reducing linear control valve 116, such that the brake cylinder hydraulic pressure becomes close to a target hydraulic pressure that establishes the required hydraulic braking torque.

Figure 7:
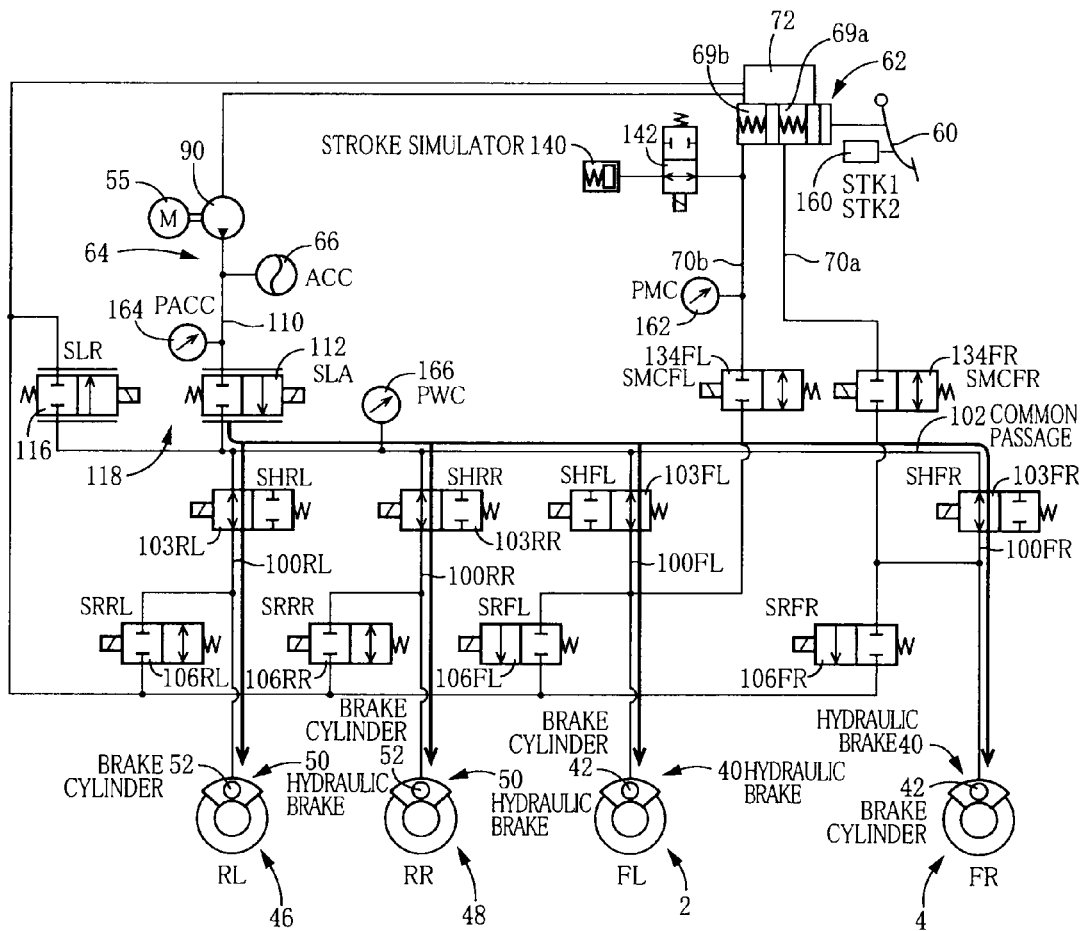
FIG. 7 is a view showing a state upon execution of the brake-hydraulic-pressure control program in the hydraulic brake system (in case of normality of the system).

During the regenerative cooperative control, in principle, all the pressure holding valves 103FR, 103FL, 103RR, 103RL provided for the respective four wheels 4, 2, 48, 46 are placed in the open states while all the pressure reducing valves 106FR, 106FL, 106RR, 106RL provided for the respective four wheels 4, 2, 48, 46 are placed in the closed states, as shown in FIG. 7. Further, the master cut-off valves 134FR, 134FL are placed in the closed states, while the simulator controlling valve 142 is placed in the open state. The brake cylinders 42FR, 42FL provided for the front right and left wheels 4, 2 are isolated from the master cylinder 62, and the brake cylinders 42, 52 provided for the front right, front left, rear right and rear left wheels 4, 2, 48, 46 are in communication with the common passage 102. The pressure-increasing linear control valve 112 and the pressure-reducing linear control valve 116 are controlled so as to control hydraulic pressure, and the controlled hydraulic pressure is supplied to the common passage 102 and the brake cylinders 42, 52 provided for the respective four wheels.

In this state, if a braking slip of the wheels 2, 4, 46, 48 is excessively large so as to satisfy an anti-lock control starting condition, the pressure holding valves 103 and pressure reducing valves 106 are opened or closed independently of one another whereby the hydraulic pressure in each of the brake cylinders 42, 52 is controlled, so that a slipping state of each of the front right, front left, rear right and rear left wheels 4, 2, 48, 46 is optimized. In principle, the pressure holding valve 103 and the pressure reducing valve 106, which are provided for an excessively slipping wheel, are controlled. However, in the anti-lock control, there is a case where the pressure holding valve 103 and the pressure reducing valve 106, which are provided for a non-excessively slipping wheel, are also controlled. In any case, the pressure holding valves 103 and the pressure reducing valves 106 are valves that are to be subjected to a wheel slip control such as the anti-lock control.

Further, in a case where the hydraulic brake system is installed on a vehicle which is not provided with the electric drive device 6, i.e., on a vehicle in which the regenerative cooperative control is not executed, the output hydraulic-pressure control valve device 118 is controlled such that the hydraulic braking torque is made equal to the total required braking torque.

2) In Case of Failure of Control System
(Including Case of Failure of Brake ECU 56)

Figure 8:
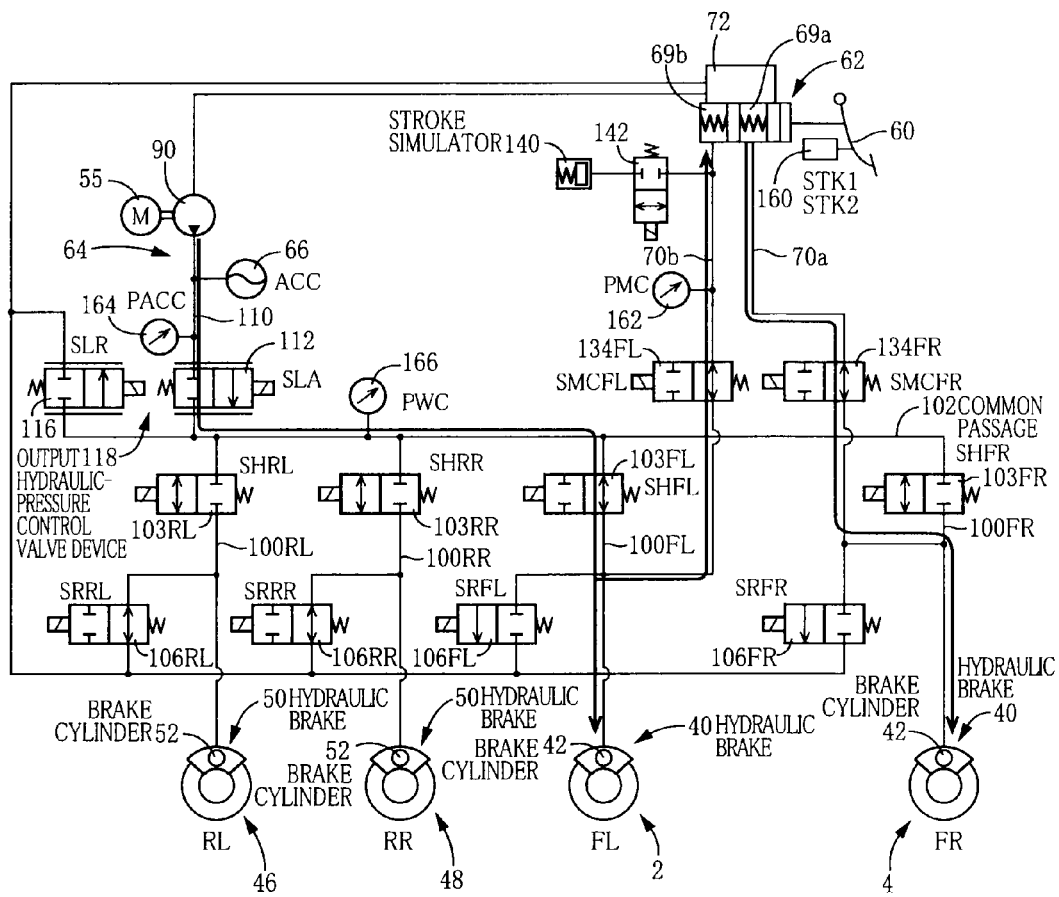
FIG. 8 is a view showing another state upon execution of the brake-hydraulic-pressure control program in the hydraulic brake system (in case of failure of a control system of the brake system).
Figure 10:
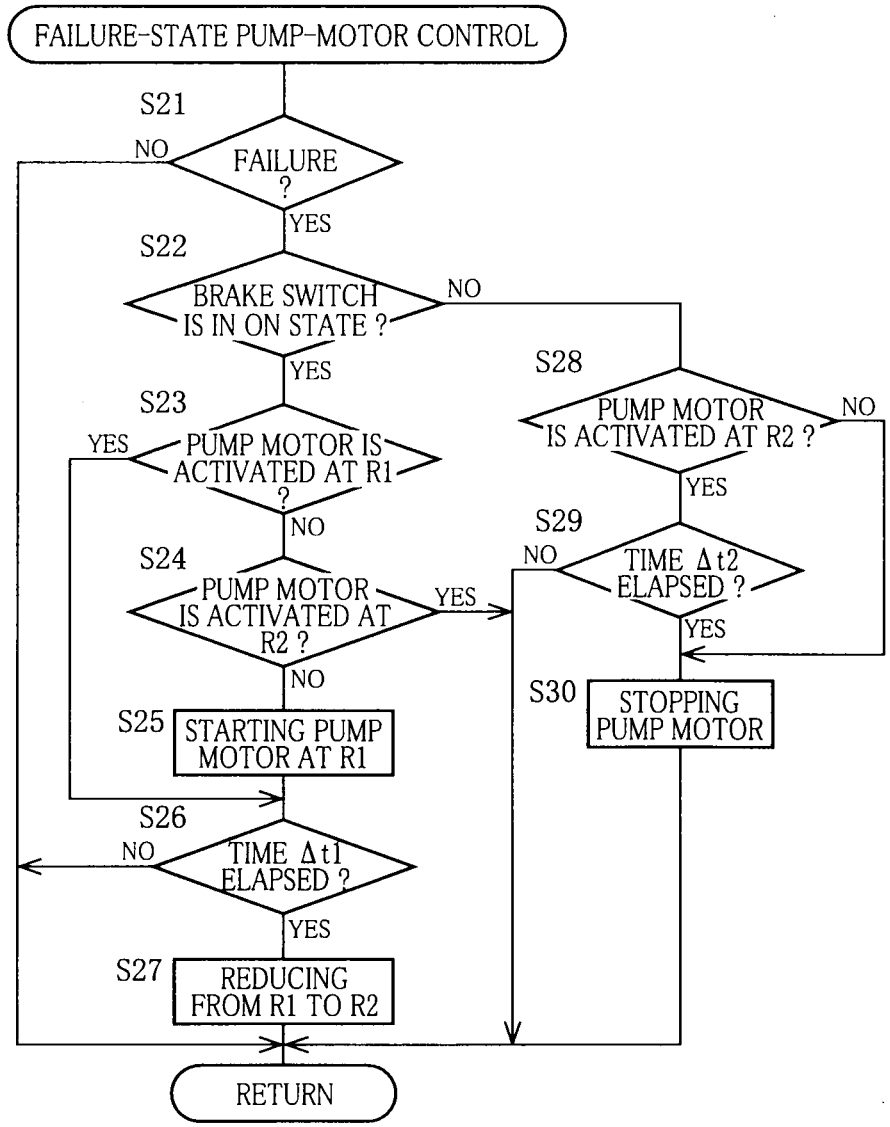
FIG. 10 is a flow chart showing a failure-state pump-motor control program stored in a memory portion of a pump motor ECU that is included in the hydraulic brake system.

In case of failure of the control system, all the electromagnetic valves are placed back in the respective original positions, as shown in FIG. 8, and the pump motor 55 is controlled in accordance with a failure-state pump-motor control program that is represented by flow chart of FIG. 10.

The pressure-increasing linear control valve 112 and the pressure-reducing linear control valve 116 are placed in the closed states, by not supplying the electric current to the solenoids 126, whereby the power hydraulic pressure source 64 is isolated from the common passage 102.

The pressure holding valve 103FL is placed in the open state while the pressure holding valves 103FR, 103RR, 103RL are placed in the closed states. The brake cylinder 42FL provided for the front left wheel 2 is in communication with the common passage 102, while the brake cylinders 42FR, 52RR, 52RL provided for the front right, rear right and rear left wheels 4, 48, 46 are isolated from the common passage 102.

The pressure reducing valves 106FR, 106FL provided for the front right and left wheels 4, 2 are placed in the closed states, while the pressure reducing valves 106RR, 106RL provided for the rear right and left wheels 48, 46 are placed in the open states.

The master cut-off valves 134FR, 134FL are placed in the open states.

In a case where the pump motor 55 can be normally activated in spite of the failure of the control system, the pump motor 55 is controlled by the pump-motor ECU 57 so as to be activated in accordance with a predetermined pattern whereby the working fluid is delivered from the pump 90.

When the pressure-difference-based force Fp (which is based on the pressure difference between the hydraulic pressure of the working fluid discharged by the pump 90 and the hydraulic pressure in the common passage 102) becomes larger than a biasing force Fs of the spring 124 of the pressure-increasing linear control valve 112 (Fp>Fs), the pressure-increasing linear control valve 112 is switched from the closed state to the open state whereby the working fluid delivered from the pump 90 is supplied to the common passage 102. The hydraulic pressure supplied to the common passage 102 is supplied via the pressure holding valve 103FL to the brake cylinder 42FL provided for the front left wheel 2.

Further, the hydraulic pressure in the common passage 102 is supplied to the second pressurizing chamber 69b of the master cylinder 62, since the common passage 102 is in communication with the second pressurizing chamber 69b via the pressure holding valve 103FL and the second master cut-off valve 134FL which are placed in the open states.

The hydraulic pressure of the working fluid supplied to the second pressurizing chamber 69b is lower than the hydraulic pressure of the working fluid discharged by the pump 90, by an amount corresponding to the valve opening pressure Po of the pressure-increasing linear control valve 112.

Meanwhile, by operation of the brake pedal 60, the hydraulic pressure is generated in the first and second pressurizing chambers 69a, 69b of the master cylinder 62. It is considered that the hydraulic pressure of the working fluid supplied from the pump 90 is higher than the hydraulic pressure in the second pressurizing chamber 69b, which pressure is dependent on the operating force applied to the brake pedal 60.

With increase of the hydraulic pressure in the second pressurizing chamber 69b, the second pressurizing pistons 68b is forced to be moved rearwardly whereby the hydraulic pressure in the first pressurizing chamber 69a is increased. The increased hydraulic pressure in the first pressurizing chamber 69a is supplied via the first master cylinder passage 70a to the brake cylinder 42FR provided for the front right wheel 4. Since the pressure holding valve 103FR is placed in the closed state, the brake cylinder 42FR is isolated from the common passage 102 whereby the hydraulic pressure in the brake cylinder 42FR provided for the front right wheel 4 is increased.

In the present embodiment in which the extension limiting portion 77 is disposed between the first and second pressurizing pistons 68a, 68b of the master cylinder 62, the forward movement of the second pressurizing piston 68b is limited by the extension limiting portion 77 even if the working fluid is supplied to the first pressurizing chamber 69a. On the other hand, the rearward movement of the second pressurizing piston 68b is not limited by the extension limiting portion 77. In view of this, the hydraulic pressure is supplied to the second pressurizing chamber 69b that is located on the front side of the second pressurizing piston 68b.

There will be described a reason why the hydraulic pressure in each of the first and second pressurizing chambers 69a, 69b is increased by supplying the hydraulic pressure to the second pressurizing chamber 69b, even without changing amount of the operating force applied to the brake pedal 60.

The following expressions (1), (2) represent hydraulic pressures Pmca, Pmcb, which are generated in the respective first and second pressurizing chambers 69a, 69b of the master cylinder 62 when the brake pedal 60 is depressed.

$$Pmca \cdot A = F - Fsa - F\mu a \quad (1)$$

$$Pmcb \cdot A = Pmca \cdot A - (Fsb - Fsa) - F\mu b \quad (2)$$

In the above expressions, "A" represents a pressure receiving area of each of the first and second pressurizing pistons 68a, 68b (the pressure receiving areas of the respective first and second pressurizing pistons 68a, 68b are equal to each other in the present embodiment), and "F" represents a force (hereinafter simply referred to as "operating force") applied to the first pressurizing piston 68a as a result of the operating force applied to the brake pedal 60. Further, "Fsa" and "Fsb" are biasing forces of the respective springs 73a, 73b, and "Fμa" and "Fμb" are friction forces generated between the housing 67 and the respective pressurizing pistons 68a, 68b.

Figure 9A:
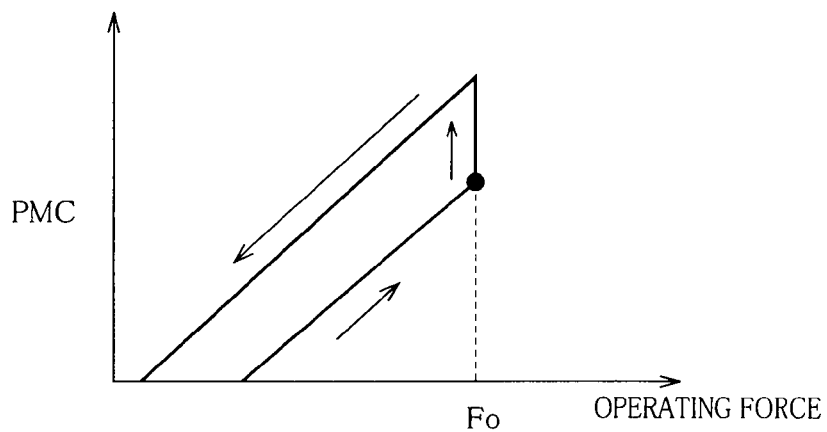
FIG. 9A is a view showing a relationship between an operating force and hydraulic pressure in a master cylinder when a pump motor is controlled in case of failure of the control system of the brake system.
Figure 9B:
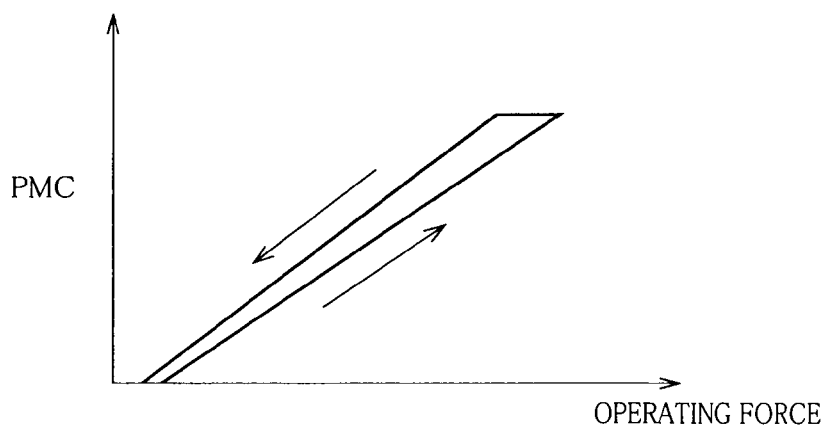
FIG. 9B is a view showing a relationship between the operating force and the hydraulic pressure in the master cylinder when the pump motor is not being controlled.

Normally, as shown in FIG. 9B, there is established a hysteresis relationship between the operating force F and each of the hydraulic pressures Pmca, Pmcb of the respective first and second pressurizing chambers 69a, 69b, due to the friction force generated between the housing 67 and a corresponding one of the pressurizing pistons 68a, 68b.

Described specifically, with increase of the operating force F, each of the first and second pressurizing pistons 68a, 68b is moved forwardly against the friction force. With reduction of the operating force F, each of the first and second pressurizing pistons 68a, 68b is moved back, since the hydraulic pressure in a corresponding one of the first and second pressurizing chambers 69a, 69b acts on each of the first and second pressurizing pistons 68a, 68b in the reverse direction. In this instance, the friction force acts in one of opposite directions upon increase of the operating force F, and acts in the other of the opposite directions upon reduction of the operating force F. Therefore, even when the operation force is reduced after being held constant, the hydraulic pressure in each of the first and second pressurizing chambers 69a, 69b is held constant due to hysteresis corresponding to the friction force.

When the hydraulic pressure is supplied to the second pressurizing chamber 69b by controlling the pump motor 55, the first and second pressurizing pistons 68a, 68b are forced to be moved rearwardly.

The following expressions (3), (4) represent hydraulic pressures Pmca', Pmcb', which are generated in the respective first and second pressurizing chambers 69a, 69b of the master cylinder 62.

$$Pmca' \cdot A = F - Fsa + F\mu a \quad (3)$$

$$Pmcb' \cdot A - F\mu b = Pmca' \cdot A - (Fsb - Fsa) \quad (4)$$

As is clear from comparison of the expressions (3), (4) with the expressions (1), (2), the hydraulic pressures in the respective first and second pressurizing chambers 69a, 69b represented by the expressions (3), (4) are higher than those represented by the expressions (1), (2), as long as amount of the operating force F is the same.

$$Pmca' > Pmca$$

$$Pmcb' > Pmcb$$

FIG. 9A shows, by way of example, an assumed case in which the hydraulic pressure is supplied to the second pressurizing chamber 69b when the operating force F is $F_0$. As is apparent from FIG. 9A, in this case, even while the operating force F is held at $F_0$, the hydraulic pressure in each of the first and second pressurizing chambers 69a, 69b is made higher, by an amount corresponding to the friction force, than where the hydraulic pressure is not supplied to the second pressurizing chamber 69b.

Figure 9C:
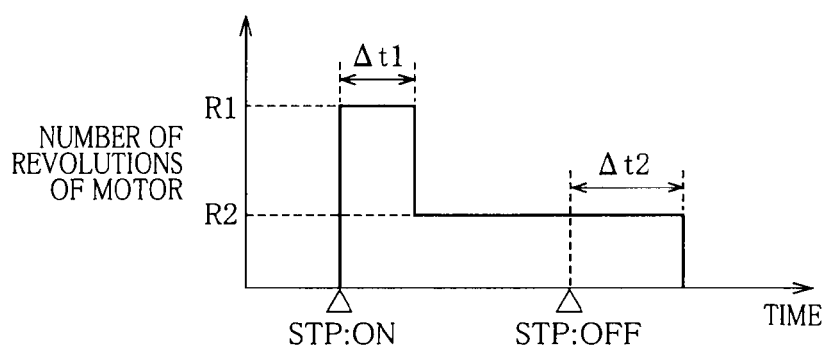
FIG. 9C is a view schematically showing a pattern for controlling the pump motor in case of failure of the control system of the brake system.

In the present embodiment, the number of revolutions of the pump motor 55 is controlled in accordance with a pattern indicated in FIG. 9C. According to this pattern, the number of revolutions is set at a first number of revolutions R1 upon satisfaction of the failure-state control starting condition, and is held at the first number of revolutions R1 for a first predetermined time Δt1. Then, after elapse of the first predetermined time Δt1, the number of revolutions is set at a second number of revolutions R2 which is smaller than first number of revolutions R1 (R2<R1). Then, when a second predetermined time Δt2 elapses after the brake switch 158 has been turned to the OFF state, it is judged that a failure-state control terminating condition whereby the pump motor 55 is stopped.

The first number of revolutions R1 is an amount enabling the discharge pressure of the pump 90 to be increased to a value which enables the pressure-increasing linear control valve 112 to be rapidly switched from the closed state to the open state, and which enables the hydraulic pressure to be supplied to the second pressurizing chamber 69b.

The first predetermined time Δt1 is a length of time that is required for enabling the pump 90 to discharge a large amount of the working fluid.

After the discharge pressure of the pump 90 has become higher than the valve opening pressure, the number of revolutions is reduced to the second number of revolutions R2 since the amount of the working fluid discharged from the pump 90 is not required to be increased. That is, a rate of the amount of the working fluid discharged from the pump 90 is held substantially constant, so that a rate of the amount of the working fluid supplied to the master cylinder 62 is also held substantially constant.

Since the brake pedal 60 is not completely returned to its original position even after the brake switch 158 has been turned to the OFF state, the pump motor 55 is kept activated even after the brake switch 158 has been turned to the OFF state, for preventing reduction of the braking force as long as the brake pedal 60 is not yet completely returned to the original position.

That is, during activation of the pump 90, with reduction of the operating force F applied to the brake pedal 60, the first and second pressurizing pistons 68a, 68b are moved rearwardly so that the pressure reservoir cut-off valves 82, 83 are switched from the closed states to the open states. As the pressure reservoir cut-off valves 82, 83 are placed in the open states, the first and second pressurizing chambers 69a, 69b are brought into communication with the reservoir 72 whereby the hydraulic pressures in the first and second pressurizing chambers 69a, 69b are reduced. When the operating force F is increased again, the first and second pressurizing pistons 68a, 68b are moved forwardly, so that the pressure reservoir cut-off valves 82, 83 are switched from the open states to the closed states whereby the hydraulic pressures in the first and second pressurizing chambers 69a, 69b are increased. Thus, in the present embodiment, the second number of revolutions R2 is an amount which enables the communication and isolation of the first pressurizing chamber 69a and the reservoir 72 to be controlled by the operating force F, and which enables the hydraulic pressures in the first and second pressurizing chambers 69a, 69b to be controlled by the operating force F.

The following expressions (5), (6), (7) represent hydraulic pressures Pmca", Pmcb", which are generated in the respective first and second pressurizing chambers 69a, 69b of the master cylinder 62. It is noted that, in the following expressions, "Ag" represents an opening area of the reservoir cut-off valve 82, "Cd" represents a flow rate coefficient of the working fluid flowing along a communication passage, and "Q" represents an amount of the working fluid flowing along the communication passage.

$$Pmca''\cdot A = F - Fsa + F\mu a \quad (5)$$

$$Pmcb''\cdot A - F\mu b = Pmca''\cdot A - (Fsb - Fsa) \quad (6)$$

$$Q = Cd\cdot Ag\cdot (2\cdot Pmca''/\rho)^{1/2} \quad (7)$$

From the expressions (5), (6), (7), it is understood that the hydraulic pressures Pmca", Pmcb" in the first and second pressurizing chambers 69a, 69b can be adjusted by adjusting the opening area Ag of the reservoir cut-off valve 82 in a state where the flow amount Q is held constant.

The failure-state pump-motor control program represented by the flow chart of FIG. 10 is executed at a predetermined time interval.

This control program is initiated with step S21 that is implemented to judge whether a control-system failure information is supplied or not, and to judge whether the brake ECU 56 suffers from a failure or not. Hereinafter, the failure of each of the control system and the brake ECU 56 will be simply referred to as "failure" where appropriate. In case of the failure, step S22 is implemented to judge whether the brake switch 158 is in the ON state. When the brake switch 158 is in the ON state, the control flow goes to steps S23 and S24. In step S23, it is judged whether or not the pump motor 55 is activated at the first number of revolutions R1. In step S24, it is judged whether or not the pump motor 55 is activated at the second number of revolutions R2. When the pump motor 55 is in its stopped state, the control flow goes to step S25 in which the pump motor 55 starts to be rotated at the first number of revolutions R1. Step S25 is followed by step S26 in which it is judged whether the first predetermined time Δt1 has elapsed or not. When step S26 is implemented for the first time, a negative judgment (NO) is obtained whereby the control flow goes back to step S21.

In this instance, since the pump motor 55 is rotated at the first number of revolutions R1, a positive judgment (YES) is obtained in step S23 if the brake switch 158 is in the ON state. The control flow goes to step S26 in which it is judged whether the first predetermined time Δt1 has elapsed or not. Steps S21, S22, S23, S26 are implemented repeatedly until the first predetermined time Δt1 elapses. When the first predetermined time Δt1 has elapsed, a positive judgment (YES) is obtained in step S26, whereby the control flow goes to step S27 in which the number of rotations of the pump motor 55 is reduced to the second number of revolutions R2.

When the pump motor 55 is rotated at the second number of revolutions R2 with the brake switch 158 being placed in the ON state, a positive judgment (YES) is obtained in step S24, and the second number of revolutions R2 of the pump motor 55 is maintained.

When the brake switch 158 is turned from the ON state to the OFF state after the repeated implementations of steps S21-S24, a negative judgment (NO) is obtained in step S22, and the control flow goes to step S28 that is implemented to judge whether or not the pump motor 55 is rotated at the number of revolutions R2. When the pump motor 55 is rotated at the number of revolutions R2, step S28 is followed by step S29 that is implemented to judge whether the second predetermined time Δt2 has elapsed or not. Steps S21, S22, S28, S29 are implemented repeatedly until the second predetermined time Δt2 elapses. When the second predetermined time Δt2 has elapsed, a positive judgment (YES) is obtained in step S29, and the control flow goes to step S30 in which the pump motor 55 is stopped.

On the other hand, after the pump motor 55 has started to be activated, when the brake switch 158 is turned from the ON state to the OFF state before elapse of the first predetermined time Δt1, a negative judgment (NO) is obtained in step S28 whereby step S30 is implemented to stop the pump motor 55.

In a state in which the brake switch 158 is placed in the OFF state with the pump motor 55 being stopped, steps S21, S22, S28, S30 are repeatedly implemented even in case of the failure, whereby the pump motor 55 is held in the stopped state.

As described above, in the present embodiment, in case of the failure of the control system, the pump motor 55 is activated so that the hydraulic pressure in the brake cylinders 42FR, 42FL can be made higher than the hydraulic pressure corresponding to the operating force F (i.e., the hydraulic pressures in the first and second pressurizing chambers 69a, 69b where there is no flow of the hydraulic pressure back to the second pressurizing chamber 69b).

It is also possible to cause the pump motor 55 to be activated continuously after detection of the failure of the control system, even when the brake switch 158 is placed in the OFF state.

Figure 11:
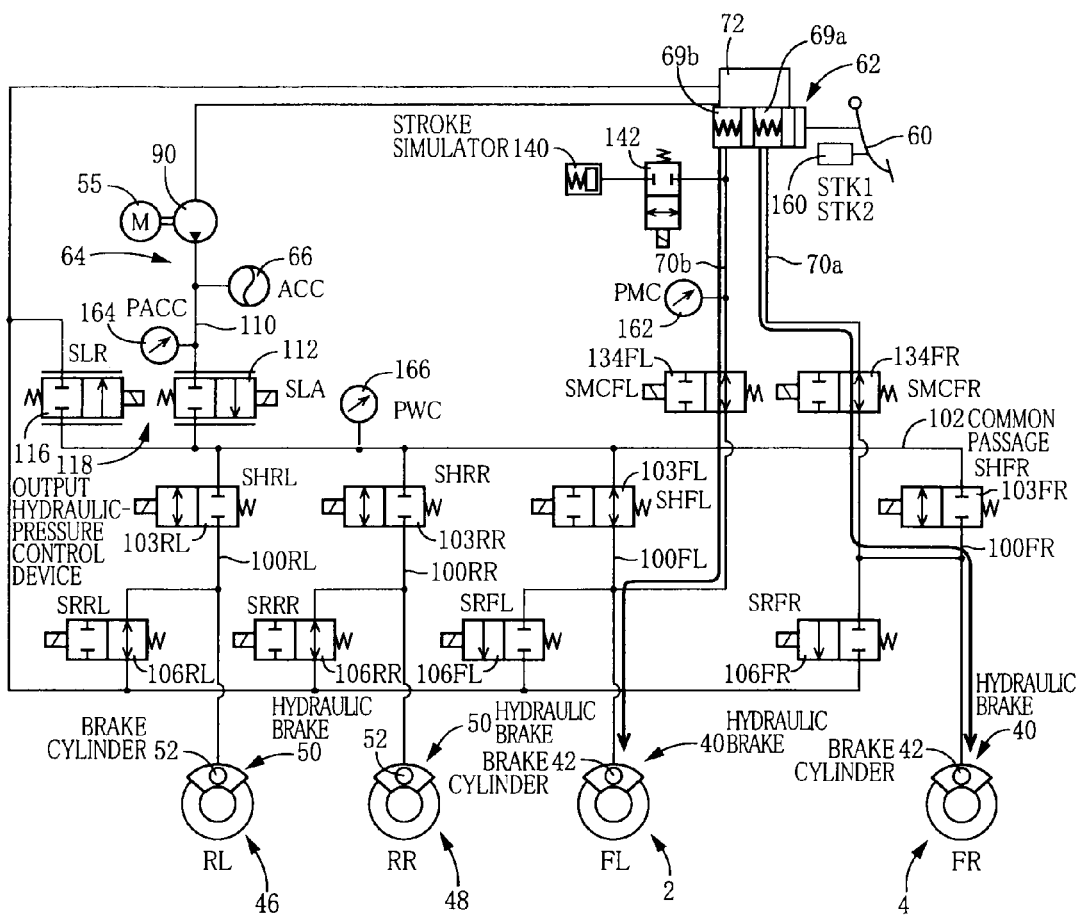
FIG. 11 is a view showing still another state upon execution of the brake-hydraulic-pressure control program in the hydraulic brake system (in case of failure of an electric system of the entirety of the brake system).

On the other hand, in case of failures of both of the brake ECU 56 and the pump-motor ECU 57, and in case of a failure of an electric power source to supply electric energy, all the electromagnetic valves are placed in the original positions as shown in FIG. 11, and the pump motor 55 is stopped. The hydraulic pressures are generated in the first and second pressurizing chambers 69a, 69b of the master cylinder 62 by operation of the brake pedal 60, and are supplied to the brake cylinders 42FR, 42FL via the first and second master cylinder passages 70a, 70b.

3) In Case of Detection of Possibility of Fluid Leakage

Figure 12:
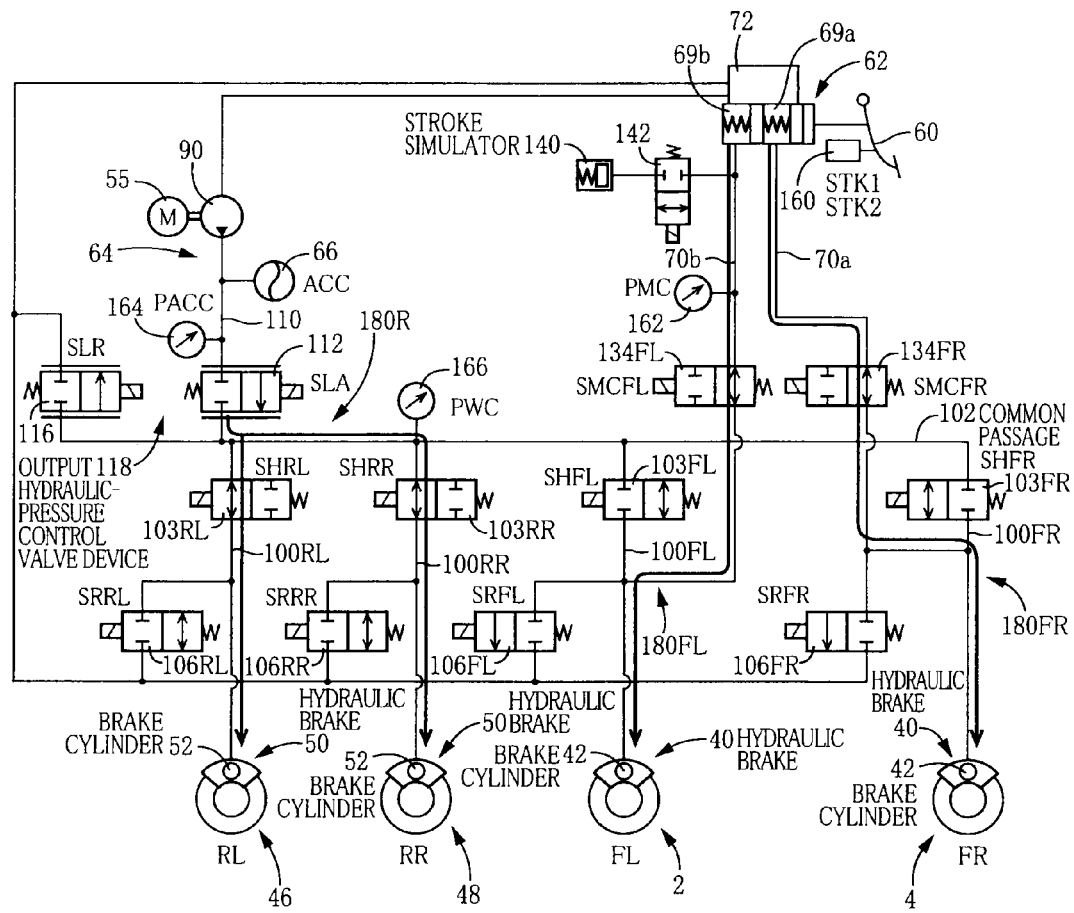
FIG. 12 is a view showing still another state upon execution of the brake-hydraulic-pressure control program in the hydraulic brake system (in case of presence of possibility of fluid leakage).

In a case where it is judged that there is a possibility of fluid leakage, the pressure holding valves 103FR, 103FL provided for the front right and left wheels 4, 2 are placed in the closes states while the pressure holding valves 103RR, 103RL provided for the rear right and left wheels 48, 46 are placed in the open states, as shown in FIG. 12. Further, the first and second master cut-off valves 134FR, 134FL are placed in the open states while the simulator controlling valve 142 is placed in the closed state. Further, all the pressure reducing valves 106 are placed in the closed states.

Since the pressure holding valves 103FR, 103FL provided for the front right and left wheels 4, 2 are placed in the closes states, the brake cylinders 42FR, 42FL provided for the front right and left wheels 4, 2 are isolated from each other, and are isolated from the brake cylinders 52RR, 52RL provided for the rear right and left wheels 48, 46. Thus, three brake lines (consisting of a brake line 180FR including the brake cylinder 42FR provided for the front right wheel 4, a brake line 180FL including the brake cylinder 42FL provided for the front left wheel 2 and a brake line 180R including the brake cylinders 52RR, 52RL provided for the rear right and left wheels 48, 46) are isolated from one another. Consequently, even if one of the three brake lines 180FR, 180FL, 180R suffers from the fluid leakage, the other brake lines are not influenced by the fluid leakage taking place in the one of the three brake lines.

Thus, the hydraulic pressures are supplied to the brake cylinders 42FR, 42FL provided for the front right and left wheels 4, 2, from the first and second pressurizing chambers 69a, 69b of the master cylinder 62. Meanwhile, the controlled hydraulic pressure is supplied to the brake cylinders 52RR, 52RL provided for the rear right and left wheels 48, 46, from the power hydraulic pressure source 64. Since the brake lines 180FR, 180FL, 180R are isolated from one another, even in the event of the fluid leakage taking place in any one of the brake lines, the hydraulic brakes in the other brake lines can be reliably activated.

4) In Case of Release of Hydraulic Brake

Upon release of the brake operation, all the electromagnetic valves are placed in the original positions, as shown in FIG. 2, since electric current is not supplied to the solenoids of the electromagnetic valves.

The hydraulic pressure is returned from the brake cylinders 42FR, 42FL provided for the front right and left wheels 2, 4, to the master cylinder 62 and the reservoir 72, via the first and second master cut-off valves 134FR, 134FL that are placed in the open states. Meanwhile, the hydraulic pressure is returned from the brake cylinders 52RR, 52RL provided for the rear right and left wheels 48, 46, to the reservoir 72, via the pressure reducing valves 106RR, 106RL that are placed in the open states.

As described above, in the present embodiment, the supply of the hydraulic pressure to the brake cylinders 42, 52 are controlled based on results of the initial checks.

In case of failure of the control system, the pump motor 55 is activated whereby a higher hydraulic pressure can be supplied to the brake cylinders 42FR, 42FL as compared with an arrangement in which the pump motor 55 is placed in the stopped state. Consequently, it is possible to avoid shortage of the braking force for the vehicle as a whole.

In case of possibility of fluid leakage, the three brake lines 180FR, 180FL, 180R are isolated from one another. Therefore, even if the fluid leakage occurs in any one of the three brake lines 180FR, 180FL, 180R, it is possible to satisfactorily avoid the other brake lines from being influenced by the fluid leakage occurring in the one of the brake lines. Further, the hydraulic brakes can be reliably activated in the brake lines that does not suffer from the fluid leakage.

Moreover, in the present embodiment, the pressure holding valves 103FR, 103RL, 103RR are constituted by the respective normally-close electromagnetic valves, while the pressure holding valve 103FL is constituted by the normally-open electromagnetic valve. Therefore, in a case where the electric current is not supplied to the solenoids of the valves, the brake cylinders 42FR, 42FL, 52RR, 52RL can be isolated from one another, so that, even if fluid leakage occurs in any one of the brake cylinders 42FR, 42FL, 52RR, 52RL, it is possible to avoid the other brake cylinders from being influenced by the fluid leakage.

In the hydraulic brake system constructed as described above, a brake hydraulic-pressure control device is constituted by, for example, portions of the brake ECU 56 which are assigned to store and execute the brake-hydraulic-pressure control program represented by the flow chart of FIG. 6. Further, an output hydraulic-pressure control device is constituted by, for example, cooperation of the output hydraulic-pressure control valve device 118 and portions of the brake ECU 56 which are assigned to store and implement steps S14 and S16 of the brake-hydraulic-pressure control program. Further, a hydraulic-pressure-source control device is constituted by, for example, portions of the pump-motor ECU 57 which are assigned to store and execute the failure-state pump-motor control program represented by the flow chart of FIG. 10. It is noted that the hydraulic-pressure-source control device serves also as a failure-state drive-source controlling portion and a failure-state drive-source activating portion.

The master cylinder 62 may be modified such that the extension limiting portion 77 is not provided in the master cylinder 62. In this modification, it is possible to employ an arrangement in which the hydraulic pressure is supplied to the first pressurizing chamber 69a.

Further, where the power hydraulic pressure source 64 includes a relief valve that is provided between the reservoir 72 and an outlet port of the pump 90, the pump motor 55 is controlled in the failure-state pump-motor control, such that the discharge pressure of the pump 90 is made lower than a relief pressure of the relief valve and higher than the valve opening pressure of the pressure-increasing linear control valve 112.

Further, where the pump motor 55 is controlled in case of failure of the control system, the first number of revolutions R1 and the first predetermined time Δt1 are determined based on the hydraulic pressure of the power hydraulic pressure source 64 (i.e., value detected by the accumulator pressure sensor 164) upon detection of the failure of the control system.

Embodiment 2

Figure 13:
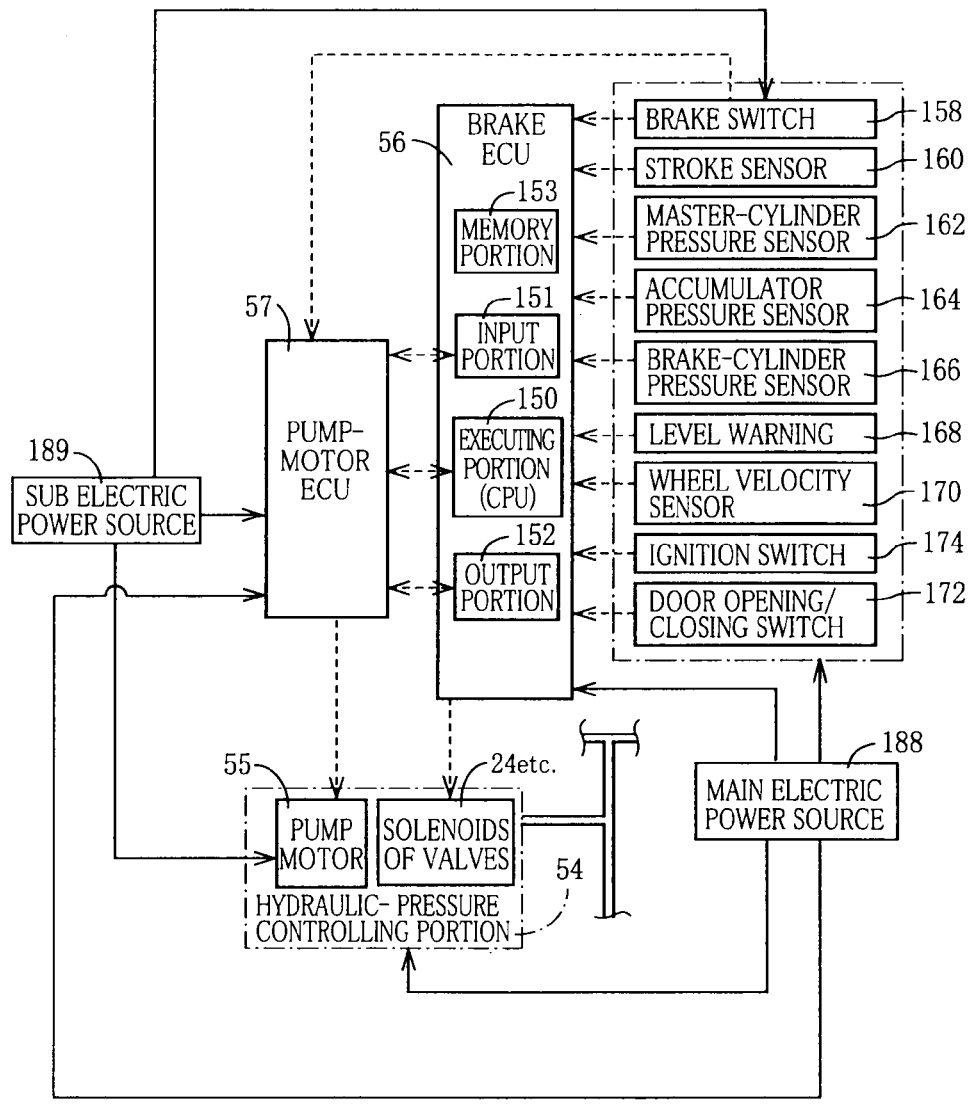
FIG. 13 is a view conceptually showing the brake ECU, pump motor ECU and their neighborhoods of a hydraulic brake system according to an embodiment 2 of the present invention.

A brake system according to embodiment 2 includes two systems as electric power source systems. FIG. 13 shows an example of the brake system according to embodiment 2.

In the present embodiment, for example, the brake ECU 56, the sensors 160-174 and the solenoids of all the electromagnetic valves are connected to the main electric power source 188 (that may be constituted by either a device identical with the storage device 22 or a device different from the storage device 22), while the pump-motor ECU 57, the pump motor 55 and the brake switch 158 are connected to both of the main electric power source 188 and the sub-electric power source 189. Therefore, even in a case where electric energy cannot be supplied from the main electric power source 188, the pump motor 55 can be activated as long as electric energy can be normally supplied from the sub-electric power source 189, whereby the hydraulic pressures in the brake cylinders 42FR, 42FL can be increased.

Embodiment 3

Figure 14:
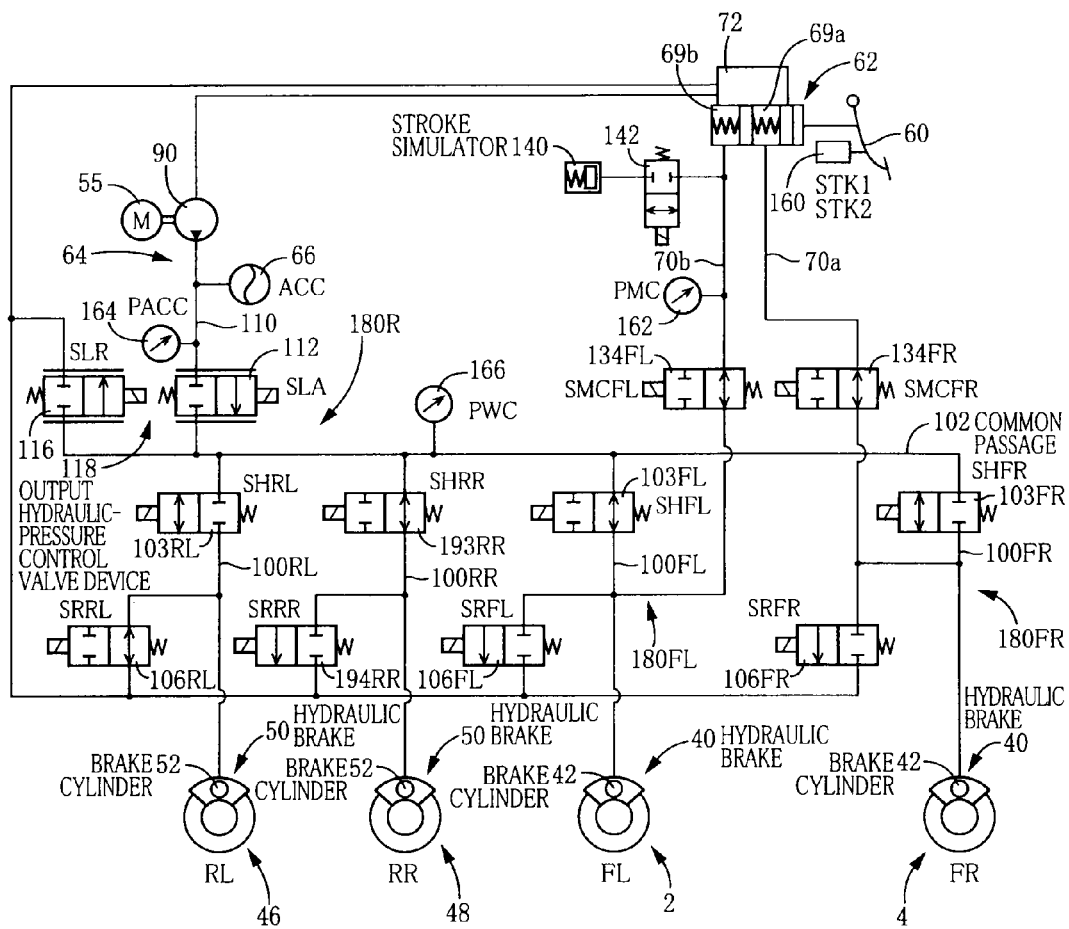
FIG. 14 is a view showing a diagram of a hydraulic circuit included in a hydraulic brake system according to an embodiment 3 of the present invention.

FIG. 14 shows a brake circuit of a brake system according to embodiment 3.

In the present embodiment, a pressure holding valve 193RR provided for the rear right wheel 48 is constituted by a normally-open electromagnetic valve, while a pressure reducing valves 194RR provided for the rear right wheel 48 is constituted by a normally-close electromagnetic valve. Consequently, in a case where the brake system functions normally, the electric current is not required to be supplied to the solenoids of the pressure holding valve 193RR and pressure reducing valve 194RR, as long as the electric current is supplied to the solenoids of the pressure holding valves 103FR, 103RL, pressure reducing valve 106RL and master cut-off valves 134FR, 134FL. Consequently, it is possible to reduce electric power that is to be consumed in the brake system.

Further, in case of failure of the control system, the working fluid discharged by the pump 90 can be supplied to the brake cylinder 52RR provided for the rear right wheel 48, so that it is possible to activate the hydraulic brakes for three wheels, i.e., front right and left wheels 4, 2 and rear right wheel 48. Consequently, it is possible to restrain reduction of braking power of the vehicle as a whole. In the failure-state pump-motor control, the first predetermined time Δt1 can be made longer than that in embodiment 1.

When the brake pedal 60 is released, the hydraulic pressure is returned from the brake cylinder 52RR provided for the rear right wheel 48, to the master cylinder 62, via the pressure holding valve 193RR, pressure holding valve 103FL and master cut-off valves 134FL.

Embodiment 4

Figure 15:
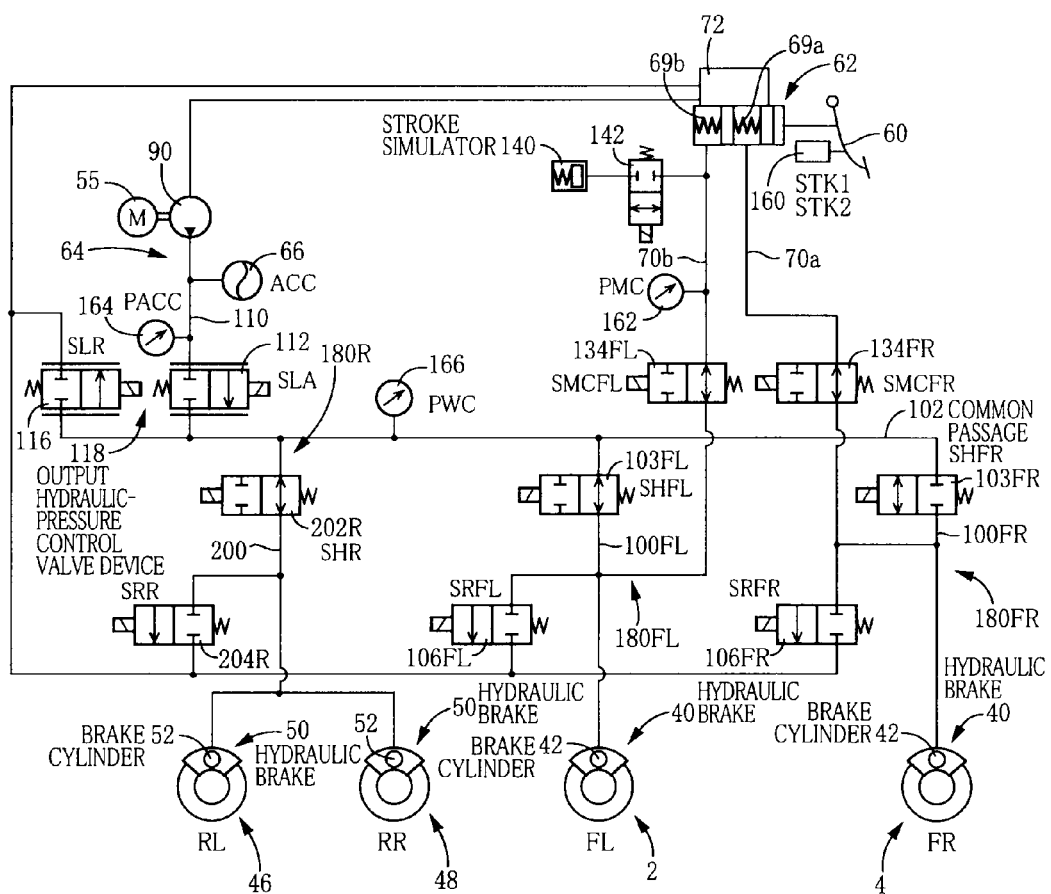
FIG. 15 is a view showing a diagram of a hydraulic circuit included in a hydraulic brake system according to an embodiment 4 of the present invention.

FIG. 15 shows a brake circuit of a brake system according to embodiment 4.

In the present embodiment, the brake cylinders 52RR, 52RL provided for the rear right and left wheels 48, 46 are controlled commonly to each other.

The brake cylinders 52RR, 52RL are connected to the common passage 102 via a rear-right/left-wheel individual passage 200 that is provided with a pressure holding valve 202R. Between the reservoir 72 and the brake cylinders 52RR, 52RL, there is disposed a pressure reducing valve 204R. The pressure holding valve 202R is a normally-open electromagnetic valve while the pressure reducing valve 204R is a normally-close electromagnetic valve. By controlling the pressure holding valve 202R and the pressure reducing valve 204R, the hydraulic pressures in the brake cylinders 52RR, 52RL provided for the rear right and left wheels 48, 46 are controlled commonly to each other.

In the present embodiment, the number of the electromagnetic valves can be reduced whereby the manufacturing cost can be reduced.

It is noted that the pressure holding valve 202R and the pressure reducing valve 204R may be constituted by a normally-close electromagnetic valve and a normally-open electromagnetic valve, respectively.

Embodiment 5

Figure 16:
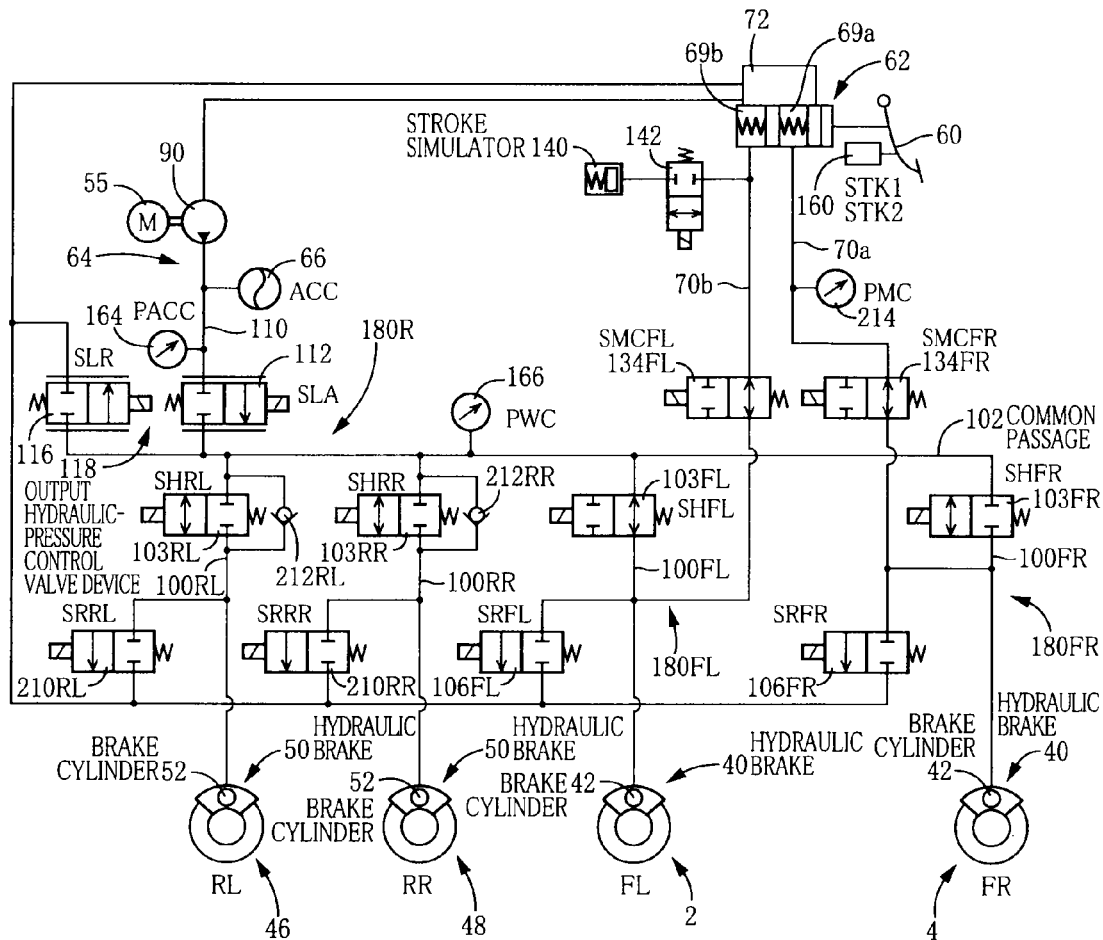
FIG. 16 is a view showing a diagram of a hydraulic circuit included in a hydraulic brake system according to an embodiment 5 of the present invention.

FIG. 16 shows a brake circuit of a brake system according to embodiment 5.

In the present embodiment, a pressure reducing valve 210RR is disposed between the reservoir 72 and the brake cylinder 52RR provided for the rear right wheel 48, and a pressure reducing valve 210RL is disposed between the reservoir 72 and the brake cylinder 52RL provided for the rear left wheel 46. Each of the pressure reducing valves 210RR, 210RL is constituted by a normally-close electromagnetic valve.

Further, a check valve 212RR is disposed in parallel with the pressure holding valve 103RR provided for the rear right wheel 48, and a check valve 212RL is disposed in parallel with the pressure holding valve 103RL provided for the rear left wheel 46. Each of the check valves 212RR, 212RL serves for allowing flow of the working fluid in a direction away from the corresponding brake cylinder 52 toward the common passage 102 and inhibiting flow of the working fluid in the opposite direction away from the common passage 102 toward the corresponding brake cylinder 52.

In a state where the brake system functions normally, the pressure holding valves 103RR, 103RL are placed in the open states. When the hydraulic brake is released, the hydraulic pressures are retuned from the brake cylinders 52RR, 52RL provided for the rear right and left wheels 48, 46, to the common passage 102 via the check valves 212RR, 212RL. The working fluid, which has been returned to the common passage 102, is returned to the master cylinder 62 via the pressure holding valve 103FL and the master cut-off valve 134FL.

Further, in the embodiment 1, the second master cylinder passage 70b is provided with the master-cylinder pressure sensor 162. However, in the embodiment 5, the first master cylinder passage 70a is provided with a master-cylinder pressure sensor 214.

When the electric current is not supplied to the solenoids of any of the electromagnetic valves, the pressure holding valve 103FL and the second master cut-off valve 134FL are placed in the open states while the pressure holding valve 103FR is placed in the closed state. Thus, since the second pressurizing chamber 69b is in communication with the common passage 102, the hydraulic pressure in the second pressurizing chamber 69b is detected by the brake-cylinder pressure sensor 166. Further, since the master cylinder passage 70a is isolated from the master cylinder passage 70b and the common passage 102, the hydraulic pressures in the first and second pressurizing chambers 69a, 69b of the master cylinder 62 are detected by the master-cylinder pressure sensor 214 and the brake-cylinder pressure sensor 166, respectively, independently of each other.

As described above, it is possible to accurately determine whether or not the hydraulic pressures are generated in the master cylinder 62, based on values detected by the master-cylinder pressure sensor 214 and the brake-cylinder pressure sensor 166. In other words, owing to the two sensors 214, 166, it is possible to accurately detect transition from a state of no generation of the hydraulic pressures in the master cylinder 62 to a state of generation of the hydraulic pressures in the master cylinder 62. Thus, the two sensors 214, 166 can be used as a brake-operation detecting device (i.e., brake switch).

Where the master-cylinder pressure sensor 214 and the brake-cylinder pressure sensor 166 are used as the brake switch, the two sensors 214, 166 are connected to the pump-motor ECU 57. In the present embodiment, the brake switch 158 is not required so that the manufacturing cost can be reduced owing to the absence of the brake switch 158.

It is noted that the arrangement in which the master-cylinder pressure sensor 214 is provided in the master cylinder passage 70a, can be applied to the brake system according to each of the above-described embodiments 1-4.

Embodiment 6

Figure 17:
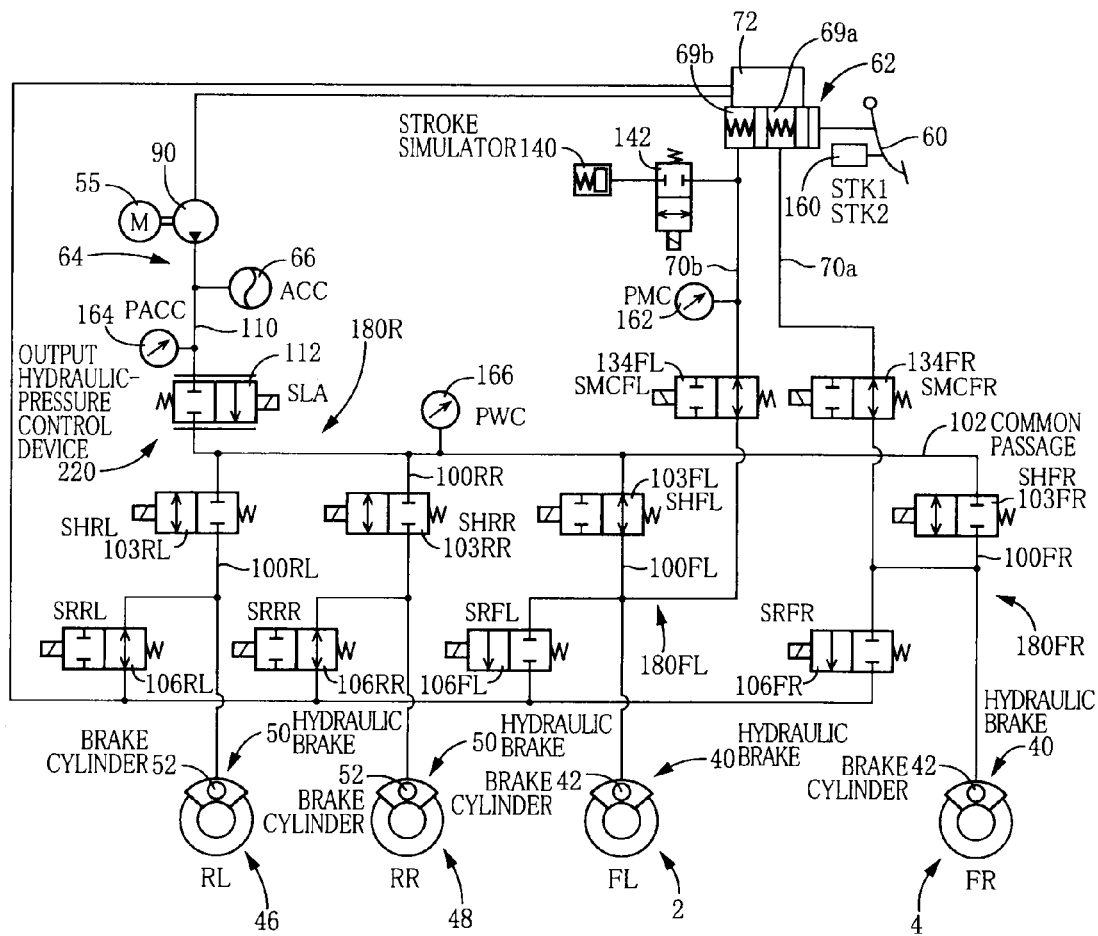
FIG. 17 is a view showing a diagram of a hydraulic circuit included in a hydraulic brake system according to an embodiment 6 of the present invention.

FIG. 17 shows a brake circuit of a brake system according to embodiment 6.

In the present embodiment, the pressure-reducing linear control valve 116 is not provided. Therefore, when the hydraulic pressure in the common passage 102 is required to be reduced, at least one of the pressure reducing valves 106FR, 106FL, 106RR, 106RL provided for the respective wheels is controlled to be placed in the open state. In this case, at least one of the pressure reducing valves 106FR, 106FL, 106RR, 106RL may be subjected to a duty control.

In a state where the brake system functions normally, the pressure holding valves 103FR, 103FL, 103RR, 103RL are placed in the open states, so that the common passage 102 is in communication with the brake cylinders 422FR, 42FL, 52RR, 52RL. Therefore, the hydraulic pressure in the common passage 102 can be controlled to be reduced, by controlling at least one of the pressure reducing valves 106.

In the present embodiment, an output hydraulic-pressure control valve device 220 is constituted by the pressure-increasing linear control valve 112 and at least one of the pressure reducing valves 106FR, 106FL, 106RR, 106RL as a pressure-reducing individual valve.

In the present embodiment, the pressure-reducing linear control valve 116 is not provided so that the manufacturing cost is reduced owing to the absence of the pressure-reducing linear control valve 116.

It is noted that the pressure-reducing individual valve may be constituted by any one or ones of the pressure reducing valves 106FR, 106FL, 106RR, 106RL and that the number of the pressure-reducing individual valve may be either one or at least two. Further, the pressure-reducing individual valve, i.e., the at least one of the pressure reducing valves 106FR, 106FL, 106RR, 106RL may be constituted by a linear control valve.

Embodiment 7

Figure 18:
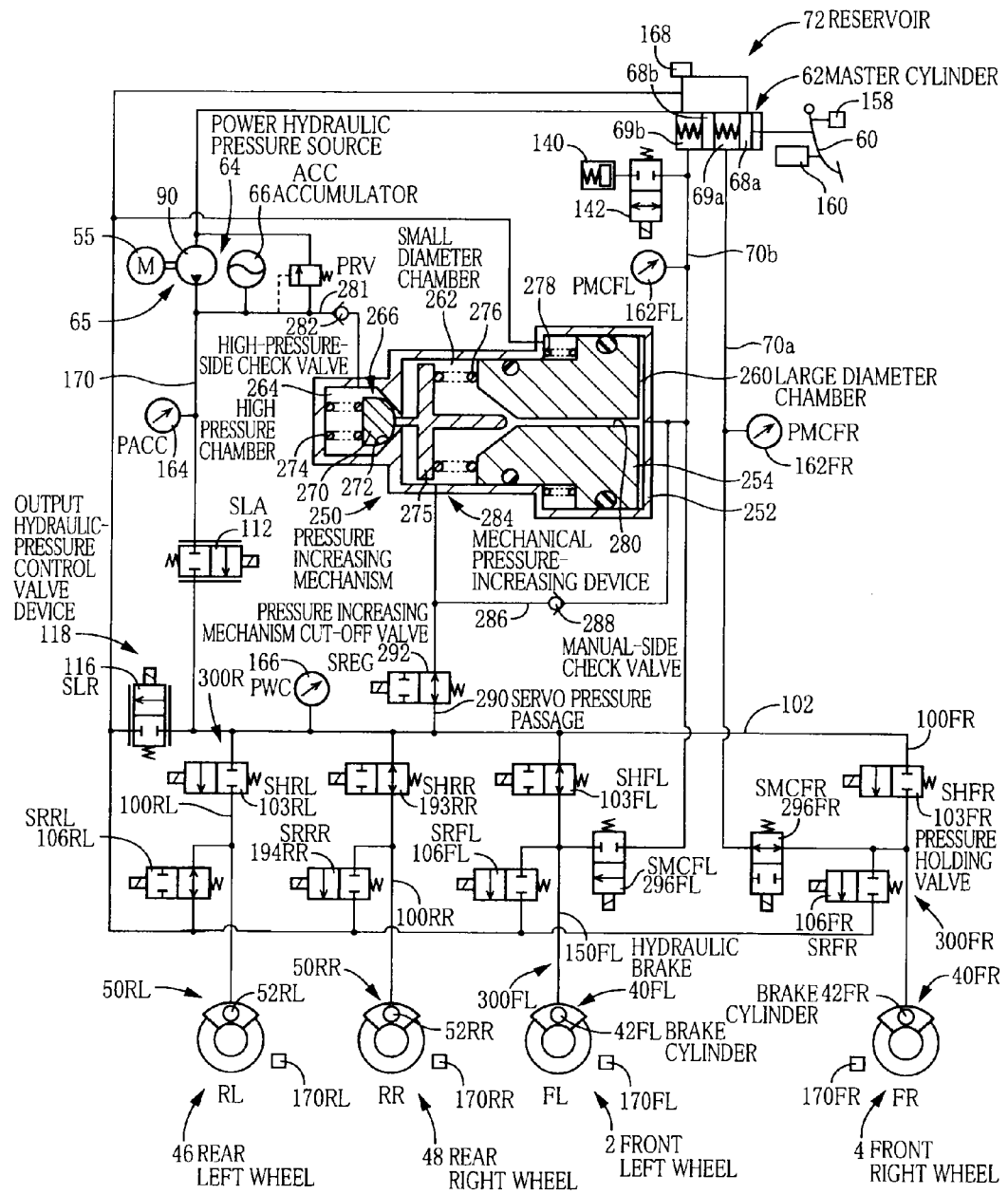
FIG. 18 is a view showing a diagram of a hydraulic circuit included in a hydraulic brake system according to an embodiment 7 of the present invention.

FIG. 18 shows a brake circuit according to embodiment 7. In the present embodiment, a pressure increasing mechanism 250 is connected to the common passage 102.

The pressure increasing mechanism 250 is disposed among the power hydraulic pressure source 64, the second master cylinder passage 70b and the common passage 102. The pressure increasing mechanism 250 includes a housing 252 and a stepped piston 254 which is fluid-tightly, slidably fitted in the housing 252. The pressure increasing mechanism 250 has a large diameter chamber 260 located on a side of the a large diameter portion of the stepped piston 254 and a small diameter chamber 262 located on a side of a small diameter portion of the stepped piston 254.

The small diameter chamber 262 is connected to a high pressure chamber 264 that is connected to the power hydraulic pressure source 64. Further, a high-pressure supply valve 266 is disposed between the small diameter chamber 262 and the high pressure chamber 264. The high-pressure supply valve 266, which is a normally-close valve, include a valve body 270, a valve seat 272 and a spring 274. The spring 274 generates a biasing force that causes the valve body 270 to be forced against the valve seat 272. In the small diameter chamber 262, a valve opening member 275 is provided to be opposed to the valve body 270. A spring 276 is disposed between the valve opening member 275 and the stepped piston 254, and generates a biasing force that causes the valve opening member 275 to be moved in a direction away from the stepped piston 254.

Between the housing 252 and a stepped portion of the stepped piston 254, a spring 278 (i.e., return spring) is disposed to bias the stepped piston 254 in the rearward direction. It is noted that a stopper (not shown) is disposed between the stepped piston 254 and the housing 252, so as to define a forward end position of the stepped piston 254.

Further, the stepped piston 254 has a communication passage 280 through which the large diameter chamber 260 and the small diameter chamber 262 are to be in communication with each other. At least when the stepped piston 254 is positioned in the reverse end position, the stepped piston 254 is distant from the valve opening member 275 so that the large diameter chamber 260 and the small diameter chamber 262 are in communication with each other via the communication passage 280. When the stepped piston 254 is moved forwardly so as to be brought into contact with the valve opening member 275, the communication between the large diameter chamber 260 and the small diameter chamber 262 is cut off.

In the present embodiment, a mechanical pressure-increasing device 284 is constituted by, for example, the above-described housing 252, stepped piston 254, high-pressure supply valve 266 and valve opening member 275.

The high pressure chamber 264 and the power hydraulic pressure source 64 are connected through a high-pressure supplying passage 281 that is provided with a high-pressure-side check valve 282 which allows flow of the working fluid in a direction away from the power hydraulic pressure source 64 toward the high pressure chamber 264 and which inhibits flow of the working fluid in the opposite direction away from the high pressure chamber 264 toward the power hydraulic pressure source 64. When the hydraulic pressure of the power hydraulic pressure source 64 is higher than the hydraulic pressure in the high pressure chamber 264, the high-pressure-side check valve 282 allows flow of the working fluid in the direction away from the power hydraulic pressure source 64 toward the high pressure chamber 264. However, when the hydraulic pressure of the power hydraulic pressure source 64 is not higher than the hydraulic pressure in the high pressure chamber 264, the high-pressure-side check valve 282 is placed in its closed state thereby inhibiting not only the fluid flow in the opposite direction away from the high pressure chamber 264 toward the power hydraulic pressure source 64 but also the fluid flow in the direction away from the power hydraulic pressure source 64 toward the high pressure chamber 264. Therefore, even if a fluid leakage takes place in the power hydraulic pressure source 64, the flow of the working fluid in the opposite direction away from the high pressure chamber 264 toward the power hydraulic pressure source 64 is prevented whereby a reduction of the hydraulic pressure in the small diameter chamber 262 is prevented.

Further, between the master cylinder passage 70b and an output side of the mechanical pressure-increasing device 284 (or between the master cylinder passage 70b and the small diameter chamber 262), a bypass passage 286 is disposed to interconnect therebetween, bypassing the mechanical pressure-increasing device 284. The bypass passage 286 is provided with a manual-side check valve 288 which allows flow of the working fluid in a direction away from the second master cylinder passage 70b toward the output side of the mechanical pressure-increasing device 284 and which inhibits flow of the working fluid in the opposite direction away from the output side of the mechanical pressure-increasing device 284 toward the second master cylinder passage 70b.

It is noted that the pressure increasing mechanism 250 is connected to the common passage 102 via a servo pressure passage 290 that is provided with a pressure increasing mechanism cut-off valve 292. The pressure increasing mechanism cut-off valve 292 is constituted by a normally-open electromagnetic valve.

In the pressure increasing mechanism 250, when the hydraulic pressure is supplied to the large diameter chamber 260 from the second pressurizing chamber 69b of the master cylinder 14, the working fluid is supplied to the small diameter chamber 262 via the communication passage 280.

When a force (generated by the hydraulic pressure in the large diameter chamber 260) acting on the stepped piston 254 in the forward direction becomes larger than the biasing force of the return spring 278, the stepped piston 254 is moved in the forward direction. When the communication passage 280 is closed by the valve opening member 275 as a result of contact of the stepped piston 254 with the valve opening member 275, the hydraulic pressure in the small diameter chamber 262 is increased and outputted.

Further, when the high-pressure supply valve 266 is turned to the open state as a result of forward movement of the valve opening member 275, the highly-pressurized working fluid is supplied from the high pressure chamber 264 to the small diameter chamber 262 whereby the hydraulic pressure in the small diameter chamber 262 is increased. On the other hand, the pressure of the working fluid accumulated in the accumulator 66 is higher than the pressure in the high pressure chamber 264, the hydraulic pressure in the accumulator 66 is supplied to the high pressure chamber 264 via the high-pressure-side check valve 282 and then supplied to the small diameter chamber 262.

The hydraulic pressure in the large diameter chamber 260 is adjusted such that the force (=hydraulic pressure in the master cylinder 62×pressure-receiving area) acting on a large diameter side of the stepped piston 254 and the force (=output hydraulic pressure×pressure-receiving area) acting on a small diameter side of the stepped piston 254, and then the adjusted hydraulic pressure in the large diameter chamber 260 is outputted. In this sense, the pressure increasing mechanism 250 may be referred to as a boosting mechanism.

Further, owing to the manual-side check valve 288, the hydraulic pressure outputted from the mechanical pressure-increasing device 284 is prevented from flowing toward the second master cylinder passage 70b.

On the other hand, when the hydraulic pressure in the accumulator 66 is not higher than the hydraulic pressure in the high pressure chamber 264, the working fluid is inhibited, by the high-pressure-side check valve 282, from flowing in either direction between the accumulator 66 and the high pressure chamber 264 whereby the stepped piston 254 cannot be moved further in the forward direction. Further, in this instance, there is a case where the stepped piston 254 cannot be moved further in the forward direction as a result of contact of the stepped piston 254 with the above-described stopper. When the hydraulic pressure in the second pressurizing chamber 69b becomes, from this state, higher than the hydraulic pressure in the small diameter chamber 262, the hydraulic pressure is supplied to the output side of the mechanical pressure-increasing device 284 via the pressure-increasing-device-bypass passage 286 and the manual-side check valve 288.

To the common passage 102, the brake cylinders 42FR, 42FL, 52RR, 52RL for the front right and left and rear right and left wheels 4, 2, 48, 46 are connected via the individual passages 100FR, 100FL, 100RR, 100RL. Like in the embodiment 3, the pressure holding valves 103FR, 103FL, 103RL, 193RR are provided in the respective individual passages 100, and the pressure reducing valves 106FR, 106FL, 106RL, 194RR are provided between the reservoir 72 and the brake cylinders 42, 52. The pressure holding valves 103FL, 193RR, which correspond to the brake cylinders 42FL, 52RR provided for the front left and rear right wheels 2, 48 that are located in respective positions that are diagonal to each other, are constituted by normally-open electromagnetic valves. Meanwhile, the pressure holding valves 103FR, 103RL, which correspond to the brake cylinders 42FR, 52RL provided for the front right and rear left wheels 4, 46 that are located in respective positions that are diagonal to each other, are constituted by normally-close electromagnetic valves.

Further, the first master cut-off valve 296FR provided in the first master cylinder passage 70a is constituted by a normally-open electromagnetic valve, while the second master cut-off valve 296FL provided in the second master cylinder passage 70b is constituted by a normally-close electromagnetic valve.

There will be described activation of a hydraulic brake system that is constructed as described above.

The initial checks are carried out substantially in the same manner as in the embodiment 1. Then, the state of supply of the hydraulic pressure is controlled by execution of a brake-hydraulic-pressure control program that is represented by flow chart of FIG. 19. This brake-hydraulic-pressure control program is similar to the brake-hydraulic-pressure control program represented by the flow chart of FIG. 6. Therefore, the same step number will be used to identify steps that are to be implemented for carrying out the same procedure as in the control program of FIG. 6, and descriptions of these steps will be omitted.

In a case where the brake system functions normally (i.e., where the control system functions normally with no possibility of fluid leakage in the present embodiment), step S54 is implemented to execute a regenerative cooperative control.

In case of failure of the control system, the control flow goes to step S55' in which the electric current is not supplied to any one of the solenoids of the respective electromagnetic valves while the pump motor 55 is stopped.

In case of detection of possibility of the fluid leakage, the control flow goes to step S56 in which the hydraulic pressure in the master cylinder 62 is supplied to the brake cylinders 42 provided for the front right and left wheels 4, 2 while the hydraulic pressure controlled by the output hydraulic-pressure control valve device 118 is supplied to the brake cylinders 52 provided for the rear right and left wheels 48, 46.

1) In Case of Normality of Hydraulic Brake System

Like in the embodiment 1, the regenerative cooperative control is executed.

The pressure increasing mechanism cut-off valve 292 is placed in the closed state whereby the pressure increasing mechanism 250 is isolated from the common passage 102. Meanwhile, the first and second master cut-off valves 296FR, 296FL are placed in the closes states whereby the brake cylinders 42FR, 42FL provided for the front right and left wheels 4, 2 are isolated from the master cylinder 62. Then, all the pressure holding valves 103 are placed in the open states while all the pressure reducing valves 106 are placed in the closed states, whereby all of the brake cylinders 42, 52 are in communication with the common passage 102. In this state, the hydraulic pressure of the power hydraulic pressure source 64 is controlled by the output hydraulic-pressure control valve device 118, and the controlled hydraulic pressure is supplied to the brake cylinders 42, 52. The hydraulic pressures in the brake cylinders 42, 52 are controlled such that a sum of the regenerative braking torque and the hydraulic braking torque is made equal to the total required braking torque that is required by the operator.

2) In Case of Failure of Control System (In Case of Failure of Electric System)

All the electromagnetic valves are returned to their original positions as shown in FIG. 18. The servo pressure outputted from the pressure increasing mechanism 250 is supplied to the common passage 102. In this instance, since the pressure holding valves 103FR, 103RL provided for the front right and rear left wheels 4, 46 are constituted by normally-close valves, the servo pressure is supplied to the brake cylinders 42FL, 52RR provided for the front left and rear right wheels 2, 48. That is, the servo pressure is supplied to the brake cylinders provided for the two wheels that are located in respective positions that are diagonal to each other.

Further, since the first master cut-off valve 296FR is placed in the open state, the hydraulic pressure in the master cylinder 62 is supplied to the brake cylinder 42FR provided for the front right wheel 4.

While the accumulator pressure is so high that the hydraulic pressure outputted from the pressure increasing mechanism 250 is higher than the hydraulic pressure in the master cylinder 62, the servo pressure outputted from the pressure increasing mechanism 250 is supplied to the brake cylinders 42FL, 52RR provided for the front left wheel 2 and rear right wheel 48. On the other hand, when the pressure of the working fluid accumulated in the accumulator 66 becomes so low that the hydraulic pressure in the second pressurizing chamber 69b becomes higher than the hydraulic pressure outputted from the pressure increasing mechanism 250, the hydraulic pressure in the master cylinder 62 is supplied to the common passage 102 via the manual-side check valve 288.

Thus, the hydraulic pressure is supplied to the brake cylinders 42FR, 42FL, 52RR provided for the front right and left wheels 4, 2 and rear right wheel 48, whereby the hydraulic brakes for the three wheels are activated. Consequently, it is possible to avoid shortage of the braking force for the vehicle as a whole.

Further, since the servo pressure is supplied for the front left wheel 2 and rear right wheel 48, it is possible to reduce a difference between the braking force applied to the right side and the braking force applied to the left side, thereby restraining generation of a yaw moment.

In a case where the pump motor 55 is activatable in the event of failure of the control system, the pump motor 55 can be activated by the pump-motor ECU 57. In this case, since reduction of the hydraulic pressure in the accumulator 66 can be restrained, the servo pressure can be satisfactorily supplied to the brake cylinders 42FL, 52RR provided for the front left wheel 2 and rear right wheel 48.

3) In Case of Detection of Possibility of Fluid Leakage

The pressure increasing mechanism cut-off valve 292 is placed in the closed state. Further, the pressure holding valves 193RR, 103RL are placed in the open states, the pressure holding valves 103FR, 103FL are placed in the closed states, and the master cut-off valves 296FR, 296FL are placed in the open states.

The hydraulic pressure of the power hydraulic pressure source 64 is controlled and supplied to the brake cylinders 52RR, 52RL provided for the rear right and left wheels 48, 46, while the hydraulic pressure in the master cylinder 62 is supplied to the brake cylinders 42FR, 42FL provided for the front right and left wheels 4, 2.

Further, the three brake lines (consisting of a brake line 300FR including the brake cylinder 42FR, a brake line 300FL including the brake cylinder 42FL and a brake line 300R including the brake cylinders 52RR, 52RL) are isolated from one another. Therefore, even if one of the three brake lines 300FR, 300FL, 300R suffers from the fluid leakage, the other brake lines are not influenced by the fluid leakage taking place in the one of the three brake lines. Accordingly, the hydraulic brake can be reliably activated in the brake line in which the fluid leakage does not take place.

4) In Case of Release of Hydraulic Brake

All the electromagnetic valves are placed in the original positions, as shown in FIG. 18. The working fluid in the brake cylinder 42FR provided for the front right wheel 4 is returned to the master cylinder 62 via the first master cylinder passages 70a, while the working fluid in the brake cylinder 42FL provided for the front left wheel 2 is returned to the master cylinder 62 via the pressure increasing mechanism 250. Further, the working fluid in the brake cylinder 52RR provided for the rear right wheel 48 is retuned to the master cylinder 62 via the pressure holding valve 193RR and pressure increasing mechanism 250, while the working fluid in the brake cylinder 52RL provided for the rear left wheel 46 is returned to the master cylinder 62 via the pressure reducing valve 106RL.

Figure 19:
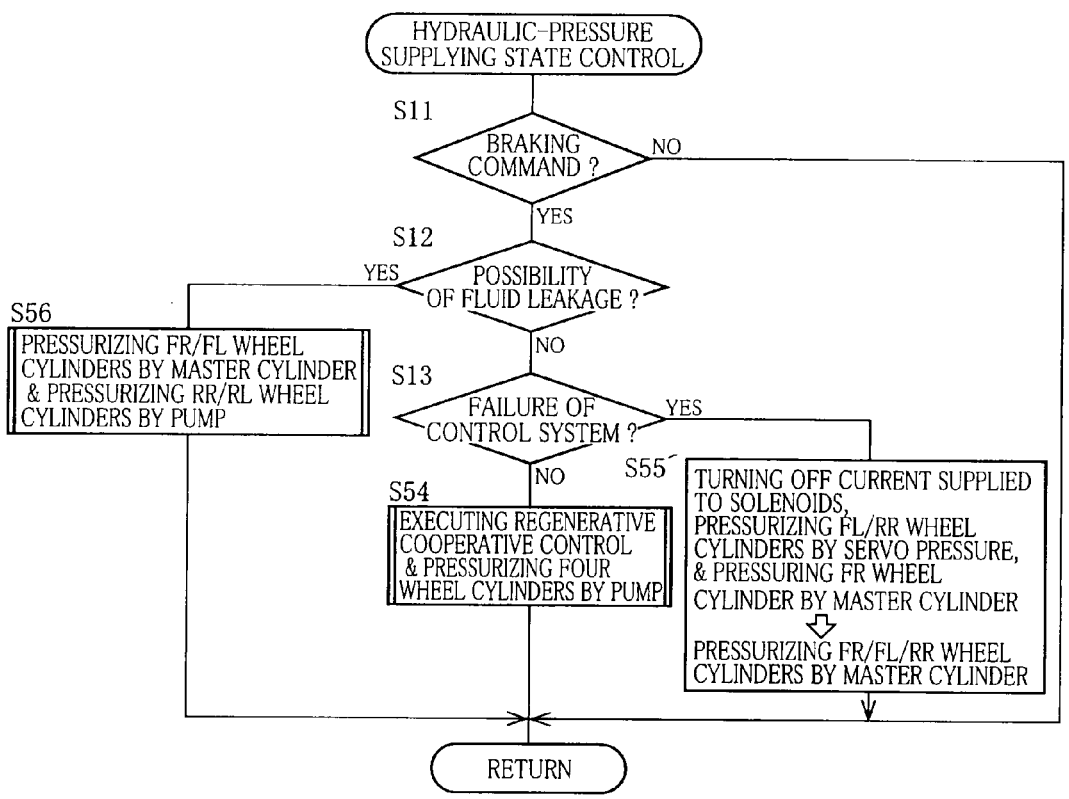
FIG. 19 is a flow chart representing a brake-hydraulic-pressure control program stored in a memory portion of a brake ECU of the hydraulic brake system.

In the present embodiment, a hydraulic-pressure supply controlling portion is constituted by portions of the brake ECU 56 which are assigned to store and execute the brake-hydraulic-pressure control program represented by the flow chart of FIG. 19. The hydraulic-pressure supply controlling portion corresponds to a control-valve controlling portion.

Further, each of the pressure holding valves 103FR, 103RL corresponds to a first individual pressure-increasing valve, while each of the pressure holding valves 103FL, 193RR corresponds to a second individual pressure-increasing valve.

It is noted that the pressure holding valve 103FL constituted by the normally-open electromagnetic valve can be held, in principle, in the closed state in case of detection of the fluid leakage, so that the brake line 300FR including the brake cylinder 42FR for the front right wheel 4 and the brake line 300FL including the brake cylinder 42FL for the front left wheel 2 can be isolated from each other. In this arrangement, even if one of the two brake lines 300FR, 300FL suffers from the fluid leakage, the other brake line is not influenced by the fluid leakage taking place in the one of the brake lines.

For example, the pressure holding valve 103FL may be adapted such that (1) the valve 103FL is held in the closed state during the ON state of the ignition switch 184, (2) the valve 103FL is held in the closed state during activation of the hydraulic brake or during operation of the brake pedal 60, (3) the valve 103FL is held in the closed state while an acceleration operating member (not shown) is not being operated, or (4) the valve 103FL is held in the closed state in a case where it is predicted that a rate of change of the hydraulic pressure in the brake cylinder is increased.

While the embodiments 1-7 have been described, the present invention can be carried out by modes in which these embodiments 1-7 and/or features of the embodiments 1-7 are combined.

For example, the technique (described in the embodiment 5) for providing the master-cylinder pressure sensor 214 in the first master cylinder passage 70a can be applied to the brake circuits described in the embodiments 1-4, 6 and 7. Further, the technique for using the pressure reducing valve 106 can be applied to the brake circuits described in the embodiments 2-5 and 7. Further, the present invention can be carried out in not only the above-described modes but also in other modes of various modifications and improvements that will be made based on knowledge of a person skilled in the art.

DESCRIPTION OF REFERENCE SIGNS 40, 50: hydraulic brake 42, 52: brake cylinder 54: hydraulic-pressure controlling portion 56: brake ECU 57: pump-motor ECU 60: brake pedal 62: master cylinder 64: power hydraulic pressure source 66: accumulator 100: individual passage 102: common passage 103: pressure holding valve 106: pressure reducing valve 110: controlled-pressure passage 112: pressure-increasing linear control valve 116: pressure-reducing linear control valve 118: output hydraulic-pressure control valve device 158: brake switch 160: stroke sensor 162: master-cylinder pressure sensor 164: accumulator pressure sensor 166: brake-cylinder pressure sensor 168: level warning switch 170: wheel velocity sensor

The invention claimed is:
1. A brake system comprising:
a plurality of hydraulic brakes provided for respective wheels of a vehicle, and configured to be activated by hydraulic pressures of respective brake cylinders thereof so as to restrain rotations of the respective wheels;
a power hydraulic pressure source including a drive source that is activatable by supply of electric energy thereto, and configured to generate hydraulic pressure by activation of said drive source; and
a common passage to which said power hydraulic pressure source and said brake cylinders of said hydraulic brakes are connected, wherein
said brake cylinders include a first brake cylinder connected to said common passage via a first individual passage that is provided with a first individual control valve, said first individual control valve being a normally-closed electromagnetic valve that is to be placed in a closed state when electric current is not being supplied to a solenoid of said first individual control valve, said brake cylinders include a second brake cylinder that is other than said first brake cylinder, said second brake cylinder being connected to said common passage via a second individual passage which is other than said first individual passage and which is provided with a second individual control valve, said second individual control valve being a normally-open electromagnetic valve that is to be placed in an open state when electric current is not being supplied to a solenoid of said second individual control valve, and said first and second brake cylinders are provided for respective front wheels of the vehicle.

2. The brake system according to claim 1, wherein each of said first and second individual control valves is an ON/OFF switch valve that is switchable between two states consisting of the open and closed states, and is to be placed in a selected one of the two states which is selected depending on whether or not the electric current is being supplied to said solenoid thereof.

3. The brake system according to claim 1, comprising first and second manual hydraulic pressure sources each of which is configured to generate hydraulic pressure by operation of a brake operating member by an operator, wherein said first manual hydraulic pressure source is connected, via a first manual passage, to a portion of said first individual passage which is located between said first individual control valve and said first brake cylinder, and wherein said second manual hydraulic pressure source is connected, via a second manual passage, to a portion of said second individual passage which is located between said second individual control valve and said second brake cylinder.

4. The brake system according to claim 3, wherein said first and second manual passages are provided with first and second manual-passage cut-off valves, respectively, each of which is a normally-open electromagnetic valve that is to be placed in an open state when electric current is not being supplied to a solenoid thereof.

5. The brake system according to claim 4, comprising:

a manual hydraulic-pressure sensor provided in said first manual passage;

a controlled hydraulic-pressure sensor provided in said common passage; and a brake-operation detecting device configured to detect, based on values detected by said manual hydraulic-pressure sensor and said controlled hydraulic-pressure sensor, generation of hydraulic pressure in each of said first and second manual hydraulic pressure sources.

6. The brake system according to claim 4, comprising an output hydraulic-pressure control device configured to control hydraulic pressure outputted from said power hydraulic pressure source, wherein said second individual control valve is provided between said output hydraulic-pressure control device and said second manual-passage cut-off valve.

7. The brake system according to claim 4, comprising a tandem master cylinder including a housing, first and second pressurizing pistons slidably fitted in said housing and an extension limiting portion provided between said first and second pressurizing pistons, said extension limiting portion being configured to limit a movement of one of said first and second pressurizing pistons relative to the other of said first and second pressurizing pistons, wherein said first manual hydraulic pressure source is a first pressurizing chamber which is defined in said housing and which is located on a front side of said first pressurizing piston, while said second manual hydraulic pressure source is a second pressurizing chamber which is defined in said housing and which is located on a front side of said second pressurizing piston.

8. The brake system according to claim 1, comprising a hydraulic-pressure-source control device configured to control activation of said power hydraulic pressure source, wherein said hydraulic-pressure-source control device includes a failure-state drive-source controlling portion that is configured, when said brake system is in a failure state, to cause said power hydraulic pressure source to be activated by controlling said drive source.

9. The brake system according to claim 1, comprising a brake hydraulic-pressure control device configured to control hydraulic pressure of at least one of the brake cylinders, based on at least a state of operation of a brake operating member by an operator, wherein said hydraulic-pressure-source control device includes a hydraulic-pressure-control-failure-state controlling portion configured, when said brake hydraulic-pressure control device is in failure, to control said drive source.

10. The brake system according to claim 3, wherein said first manual passage is provided with a first manual-passage cut-off valve which is a normally-open electromagnetic valve that is to be placed in an open state when electric current is not being supplied to a solenoid thereof, while said second manual passage is provided with a second manual-passage cut-off valve which is a normally-closed electromagnetic valve that is to be placed in a closed state when electric current is not being supplied to a solenoid thereof.

11. The brake system according to claim 10, comprising a hydraulic-pressure supply controlling portion configured to control supply of hydraulic pressure to said first and second brake cylinders, by controlling at least said first and second individual control valves and said first and second manual-passage cut-off valves, wherein said hydraulic-pressure supply controlling portion includes a control-valve controlling portion capable of switching between a first state in which said first and second brake cylinders are in communication with said common passage and a second state in which hydraulic pressure is supplied from said common passage to said second brake cylinder while hydraulic pressure is supplied from said first manual hydraulic pressure source to said first brake cylinder, said first state being established by placing each of said first and second manual-passage cut-off valves in the closed state and placing each of said first and second individual control valves in the open state, said second state being established by placing said first manual-passage cut-off valve in the open state, placing said second manual-passage cut-off valve in the closed state, placing said first individual control valve in the closed state, and placing said second individual control valve in the open state.

12. The brake system according to claim 1, wherein said hydraulic brakes are provided for respective front right, front left, rear right and rear left wheels of the vehicle that constitute two pairs of wheels, each pair of the two pairs of wheels being constituted by two of the wheels that are located in respective positions that are diagonal to each other, wherein said brake cylinders of said hydraulic brakes are connected to said common passage via respective individual passages, wherein each of two of said individual passages, which are connected to respective two of said brake cylinders provided for respective two of the wheels that constitute one pair of the two pairs of wheels, is provided with a first individual pressure-increasing valve, said first individual pressure-increasing valve being a normally-closed electromagnetic valve that is placed in a closed state when electric current is not being supplied to a solenoid thereof, wherein each of two of said individual passages, which are connected to respective two of said brake cylinders provided for respective two of the wheels that constitute the other pair of the two pairs of wheels, is provided with a second individual pressure-increasing valve, said second individual pressure-increasing valve being a normally-open electromagnetic valve that is placed in an open state when electric current is not being supplied to a solenoid thereof, and wherein said first individual pressure-increasing valve, which is provided in one of the two of said individual passages, corresponds to said first individual control valve, while said second individual pressure-increasing valve, which is provided in one of the two of said individual passages, corresponds to said second individual control valve.

13. The brake system according to claim 1,
wherein said hydraulic brakes are provided for respective front right, front left, rear right and rear left wheels of the vehicle, said brake system comprising (a) an output hydraulic-pressure control device configured to control hydraulic pressure outputted from said power hydraulic pressure source, (b) a low pressure source and (c) at least one pressure-reducing individual valve each of which is provided between said low pressure source and a corresponding one of said brake cylinders of said hydraulic brakes provided for the respective front right, front left, rear right and rear left wheels of the vehicle, wherein said output hydraulic-pressure control device includes (i) a pressure-increasing output hydraulic-pressure control valve provided between said power hydraulic pressure source and said common passage and (ii) at least one of said at least one pressure-reducing individual valve.

14. The brake system according to claim 1, comprising (a) a manual hydraulic pressure source that is configured to generate hydraulic pressure by operation of a brake operating member by an operator and (b) a pressure increasing mechanism which is provided between said manual hydraulic pressure source and said common passage and which is configured to increase hydraulic pressure of said manual hydraulic pressure source and to output the increased hydraulic pressure to said common passage.

15. A brake system comprising:
a plurality of hydraulic brakes provided for respective wheels of a vehicle, and configured to be activated by hydraulic pressures of respective brake cylinders thereof so as to restrain rotations of the respective wheels, said brake cylinders including first and second brake cylinders provided for respective front wheels of the vehicle;
a power hydraulic pressure source including a drive source activatable by supply of electric energy thereto, and configured to generate hydraulic pressure by activation of said drive source; and
a common passage to which said power hydraulic pressure source and said brake cylinders of said hydraulic brakes are connected, wherein
said brake cylinders are grouped into a plurality of brake cylinder groups such that each one of said brake cylinder groups consists of at least one of said brake cylinders, and each one of said brake cylinder groups is connected to said common passage via a corresponding one of individual passages that are provided with respective individual control valves;
one of said individual control valves is a normally-closed electromagnetic valve in one of the individual passages connected to the first brake cylinder and that is to be placed in a closed state when electric current is not being supplied to a solenoid of said normally-closed electromagnetic valve; and
one of said individual control valves is a normally-open electromagnetic valve in one of the individual passages connected to the second brake cylinder and that is to be placed in an open state when electric current is not being supplied to a solenoid of said normally-open electromagnetic valve.

16. A brake system comprising:
a plurality of hydraulic brakes provided for respective wheels of a vehicle, and configured to be activated by hydraulic pressures of respective brake cylinders thereof so as to restrain rotations of the respective wheels;
a power hydraulic pressure source including a drive source that is activatable by supply of electric energy thereto, and configured to generate hydraulic pressure by activation of said drive source;
a common passage to which said power hydraulic pressure source and said brake cylinders of said hydraulic brakes are connected; and
first and second manual hydraulic pressure sources each of which is configured to generate hydraulic pressure by operation of a brake operating member by an operator, wherein
said brake cylinders include a first brake cylinder connected to said common passage via a first individual passage that is provided with a first individual control valve, said first individual control valve being a normally-closed electromagnetic valve that is to be placed in a closed state when electric current is not being supplied to a solenoid of said first individual control valve,
said brake cylinders include a second brake cylinder that is other than said first brake cylinder, said second brake cylinder being connected to said common passage via a second individual passage which is other than said first individual passage and which is provided with a second individual control valve, said second individual control valve being a normally-open electromagnetic valve that is to be placed in an open state when electric current is not being supplied to a solenoid of said second individual control valve,
said first manual hydraulic pressure source is connected, via a first manual passage, to a portion of said first individual passage which is located between said first individual control valve and said first brake cylinder, and
said second manual hydraulic pressure source is connected, via a second manual passage, to a portion of said second individual passage which is located between said second individual control valve and said second brake cylinder.

\* \* \* \* \*